United States Patent
Kim et al.

(10) Patent No.: US 11,623,611 B2
(45) Date of Patent: Apr. 11, 2023

(54) METHODS FOR PASSENGER AUTHENTICATION AND DOOR OPERATION FOR AUTONOMOUS VEHICLES

(71) Applicant: MOTIONAL AD LLC, Boston, MA (US)

(72) Inventors: Junsung Kim, Pittsburgh, PA (US);
Yunpeng Xu, Pittsburgh, PA (US);
Vasudeva Pai Melgangolli, Pittsburgh, PA (US); Brett Sandler, Pittsburgh, PA (US); Scott Sweeny, Pittsburgh, PA (US)

(73) Assignee: Motional AD LLC, Besston, MA (US)

( * ) Notice: Subject to any disclaimer, the term of this patent is extended or adjusted under 35 U.S.C. 154(b) by 161 days.

(21) Appl. No.: 16/991,625

(22) Filed: Aug. 12, 2020

(65) Prior Publication Data

US 2021/0061224 A1     Mar. 4, 2021

Related U.S. Application Data

(60) Provisional application No. 62/893,552, filed on Aug. 29, 2019.

(51) Int. Cl.
*B60R 25/24*     (2013.01)
*G08G 1/00*     (2006.01)
(Continued)

(52) U.S. Cl.
CPC ............. *B60R 25/24* (2013.01); *B60R 13/00* (2013.01); *B60R 25/01* (2013.01); *B60R 25/25* (2013.01);
(Continued)

(58) Field of Classification Search
CPC ......... B60R 25/24; B60R 13/00; B60R 25/01; B60R 25/25; B60R 25/31;
(Continued)

(56) References Cited

U.S. PATENT DOCUMENTS 10,043,396 B2   8/2018  Salter et al.
10,095,229 B2   10/2018 Myers et al.
(Continued)

FOREIGN PATENT DOCUMENTS

CN   106971467 A   7/2017
CN   207960319 U   10/2018
(Continued)

OTHER PUBLICATIONS

Combined Search and Examination Report received for United Kingdom Patent Application No. 2013327.8, dated Feb. 17, 2021, 7 pages.
(Continued)

*Primary Examiner* — Thomas D Alunkal
(74) *Attorney, Agent, or Firm* — Knobbe, Martens, Olson & Bear LLP

(57) ABSTRACT

Disclosed are computer systems and techniques for authenticating a passenger of an autonomous vehicle and operating doors of the autonomous vehicle. For passenger authentication, the computer system is configured to receive a ride request, generate a passcode, transmit the passcode to a user account and the autonomous vehicle, authenticate the user using the passcode, and enable departure of the autonomous vehicle. For door operation, the computer system is configured to detect environmental conditions surrounding an autonomous vehicle, determine based on a set of operational conditions whether one or more doors of the autonomous vehicle are desirable for use, and operate a door if the door is safe to operate and desirable for operation.

20 Claims, 16 Drawing Sheets

(51) Int. Cl.
*B60W 60/00* (2020.01)
*B60R 13/00* (2006.01)
*B60R 25/25* (2013.01)
*H04L 9/40* (2022.01)
*B60R 25/01* (2013.01)
*B60R 25/31* (2013.01)

(52) U.S. Cl.
CPC ....... *B60R 25/31* (2013.01); *B60W 60/00253* (2020.02); *G08G 1/202* (2013.01); *H04L 63/083* (2013.01); *H04L 63/0861* (2013.01)

(58) Field of Classification Search
CPC ............. B60W 60/00253; G08G 1/202; H04L 63/083; H04L 63/0861
See application file for complete search history.

(56) References Cited

U.S. PATENT DOCUMENTS

| | | |
|---|---|---|
| 10,501,055 B1 | 12/2019 | Yi et al. |
| 11,097,690 B2 | 8/2021 | Dumov |
| 2016/0301698 A1 | 10/2016 | Katara et al. |
| 2017/0080900 A1* | 3/2017 | Huennekens ........... G08B 21/00 |
| 2017/0147959 A1* | 5/2017 | Sweeney ................ G07C 5/008 |
| 2017/0241184 A1 | 8/2017 | Rust |
| 2017/0247927 A1 | 8/2017 | Elie et al. |
| 2017/0369052 A1* | 12/2017 | Nagy ..................... B60W 30/09 |
| 2018/0074494 A1 | 3/2018 | Myers et al. |
| 2018/0075754 A1 | 3/2018 | Salter et al. |
| 2018/0188731 A1* | 7/2018 | Matthiesen ........ G01C 21/3407 |
| 2018/0224852 A1 | 8/2018 | Tanahashi et al. |
| 2018/0322775 A1 | 11/2018 | Chase et al. |
| 2018/0354411 A1 | 12/2018 | Shmueli Friedland et al. |
| 2019/0071916 A1 | 3/2019 | Dusina et al. |
| 2019/0204097 A1* | 7/2019 | Starns .................... G07C 5/008 |
| 2019/0318159 A1* | 10/2019 | Blanc-Paques ........ G06Q 50/30 |
| 2020/0143688 A1 | 5/2020 | Shah et al. |
| 2020/0223397 A1* | 7/2020 | Sakai ..................... G06Q 50/30 |
| 2021/0276597 A1 | 9/2021 | Yu et al. |

FOREIGN PATENT DOCUMENTS

| | | |
|---|---|---|
| DE | 10 2018 218 630 A1 | 4/2020 |
| DE | 10 2019 214 713 A1 | 4/2021 |
| EP | 3591589 A1 | 1/2020 |
| EP | 3620332 A1 | 3/2020 |
| ES | 2835400 A1 | 6/2021 |
| JP | 2015-191264 A | 11/2015 |
| KR | 10-2012-0105943 A | 9/2012 |
| KR | 10-1703381 B1 | 2/2017 |
| WO | WO 2014/086763 A1 | 6/2014 |

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
Chinese Office Action issued for Application No. CN No. 202010887037.6 dated Mar. 31, 2022.
Great Britain Office Action issued for Application No. GB 2013327. 8, dated Nov. 8, 2021.
Great Britain Office Action issued for Application No. GB 2117489. 1, dated Dec. 14, 2021.
Great Britain Office Action issued for Application No. GB 2117489. 1, dated Feb. 16, 2022.
Korean Office Action issued for Application No. KR 10-2020-0107820, dated Aug. 27, 2021.
Korean Office Action issued for Application No. KR 10-2020-0107820, dated Apr. 19, 2022.
Great Britain Office Action issued for Application No. GB 2213639. 4, dated Nov. 17, 2022.
Chinese Office Action issued for Application No. CN No. 202010887037.6 dated Dec. 22, 2022.
Korean Office Action issued for Application No. KR 10-2020-0107820, dated Nov. 8, 2022.

* cited by examiner

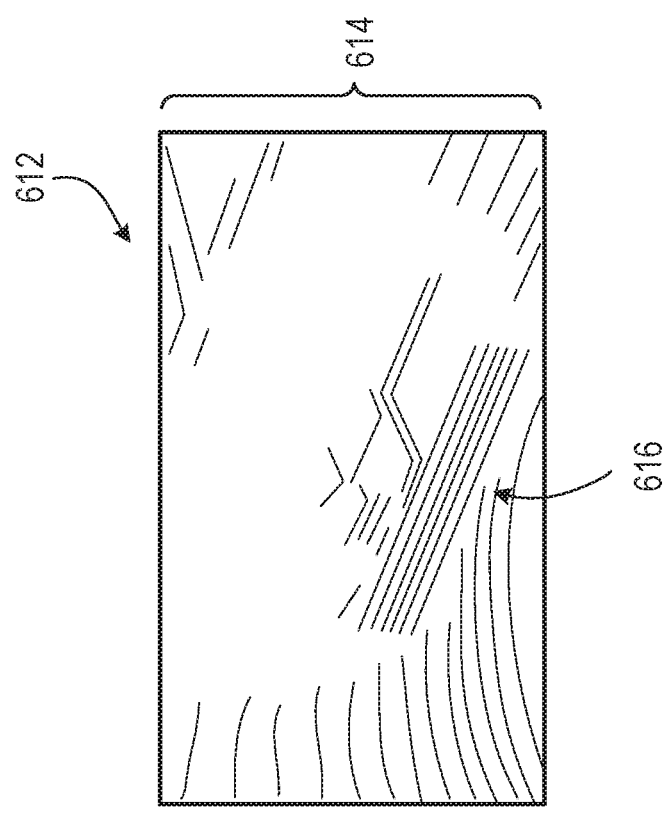
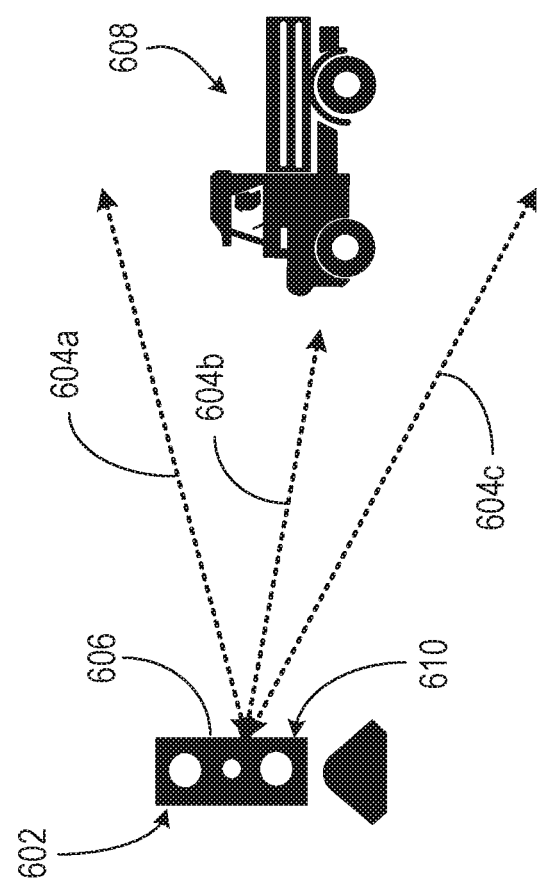
FIG. 6

METHODS FOR PASSENGER AUTHENTICATION AND DOOR OPERATION FOR AUTONOMOUS VEHICLES

CROSS-REFERENCE TO RELATED APPLICATIONS

This application claims the benefit of U.S. Provisional Patent Application 62/893,552, entitled "Methods for Passenger Authentication and Door Operation for Autonomous Vehicles," filed Aug. 29, 2019, the content of which is incorporated herein by reference in its entirety.

FIELD

This description relates to systems and methods for authenticating passengers and operating doors for use of autonomous vehicles.

BACKGROUND

Autonomous vehicles can be used to transport people and/or cargo (e.g., packages, objects, or other items) from one location to another. For example, a user account associated with a ride-share or ride-hailing service can request use of an autonomous vehicle. The autonomous vehicle is dispatched, navigates to the location of the user, waits for the user to board the autonomous vehicle, and navigates to a specified destination (e.g., a location selected by the user).

SUMMARY

The subject matter described in this specification is directed to computer systems and techniques for authenticating a passenger of an autonomous vehicle and operating doors of the autonomous vehicle. Generally, for passenger authentication, the computer system is configured to receive a ride request, generate a passcode, transmit the passcode to a user account and the autonomous vehicle, authenticate the user using the passcode, and enable departure of the autonomous vehicle. Generally, for door operation, the computer system is configured to detect environmental conditions surrounding an autonomous vehicle, determine based on a set of operational conditions whether one or more doors of the autonomous vehicle are desirable for use, and operate a door if the door is safe to operate and desirable for operation.

These and other aspects, features, and implementations can be expressed as methods, apparatuses, systems, components, program products, means or steps for performing a function, and in other ways.

These and other aspects, features, and implementations will become apparent from the following descriptions, including the claims.

BRIEF DESCRIPTION OF THE DRAWINGS

FIG. 6 shows an example of a LiDAR system.

DETAILED DESCRIPTION

Figure 1:
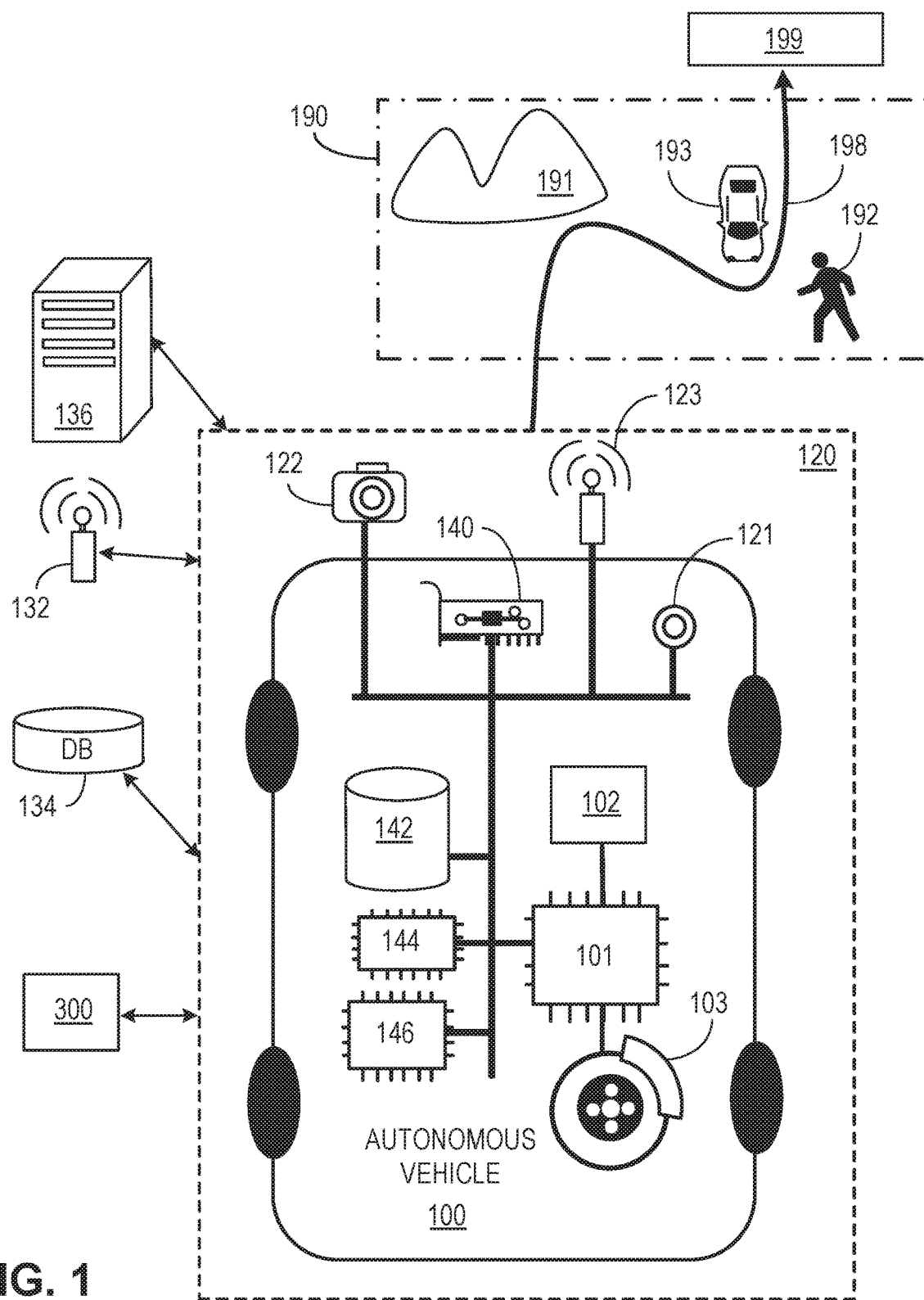
FIG. 1 shows an example of an autonomous vehicle having autonomous capability

In the following description, for the purposes of explanation, numerous specific details are set forth in order to provide a thorough understanding of the disclosed techniques. It will be apparent, however, that the disclosed techniques may be practiced without these specific details. In other instances, well-known structures and devices are shown in block diagram form in order to avoid unnecessarily obscuring the disclosed techniques.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Architecture
4. Autonomous Vehicle Inputs
5. Autonomous Vehicle Planning
6. Autonomous Vehicle Control
7. Autonomous Vehicle Ride-Hailing Service
8. Example Process for Authenticating a Passenger for Pick-Up
9. Example Process for Operating a Door of an Autonomous Vehicle General Overview Autonomous vehicles driving in complex environments (e.g., an urban environment) pose a great technological challenge. In order for autonomous vehicles to navigate these environments, the vehicles detect various types of objects such as vehicles, pedestrians, and bikes in real-time using sensors such as LIDAR or RADAR.

In some embodiments, autonomous vehicles are deployed to navigate such complex environments to provide a rideshare or ride-hailing service (referred to collectively hereafter as a "ride-hailing service") in which an autonomous vehicle is dispatched (e.g., upon a user's request) to a user's current location (or an agreed upon pickup location) to transport the user from the user's current location to one or more destination locations. Ensuring safe and effective use of an autonomous vehicle in such implementations presents great technological challenges. For example, an autonomous vehicle typically lacks human interaction that, in conventional ride-hailing services, serves to authenticate passengers and assist with ensuring safe use of the autonomous vehicle. Accordingly, there exists a need to provide safe and effective use of an autonomous vehicle to provide ride-hailing services.

In particular, the present disclosure provides one or more embodiments for authenticating a passenger of an autonomous vehicle and operating doors of the autonomous vehicle. These embodiments address safety concerns that arise in use of an autonomous vehicle for ride-hailing purposes. For example, the disclosed embodiments for passenger authentication ensure that the intended user(s) of the autonomous vehicle is able to safely locate and access the autonomous vehicle, whereas the disclosed embodiments for door operation ensure that the user(s) is able to safely enter and exit the autonomous vehicle.

Hardware Overview

FIG. 1 shows an example of an autonomous vehicle 100 having autonomous capability.

As used herein, the term "affordance" refers to a user-interactive graphical user interface object that is, optionally, displayed on a display screen of an electronic device. For example, an image (e.g., icon), a button, and text (e.g., hyperlink) each optionally constitute an affordance. An affordance can, optionally, be selected to perform an action or initiate a process.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick-up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless specified otherwise.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, WiFi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
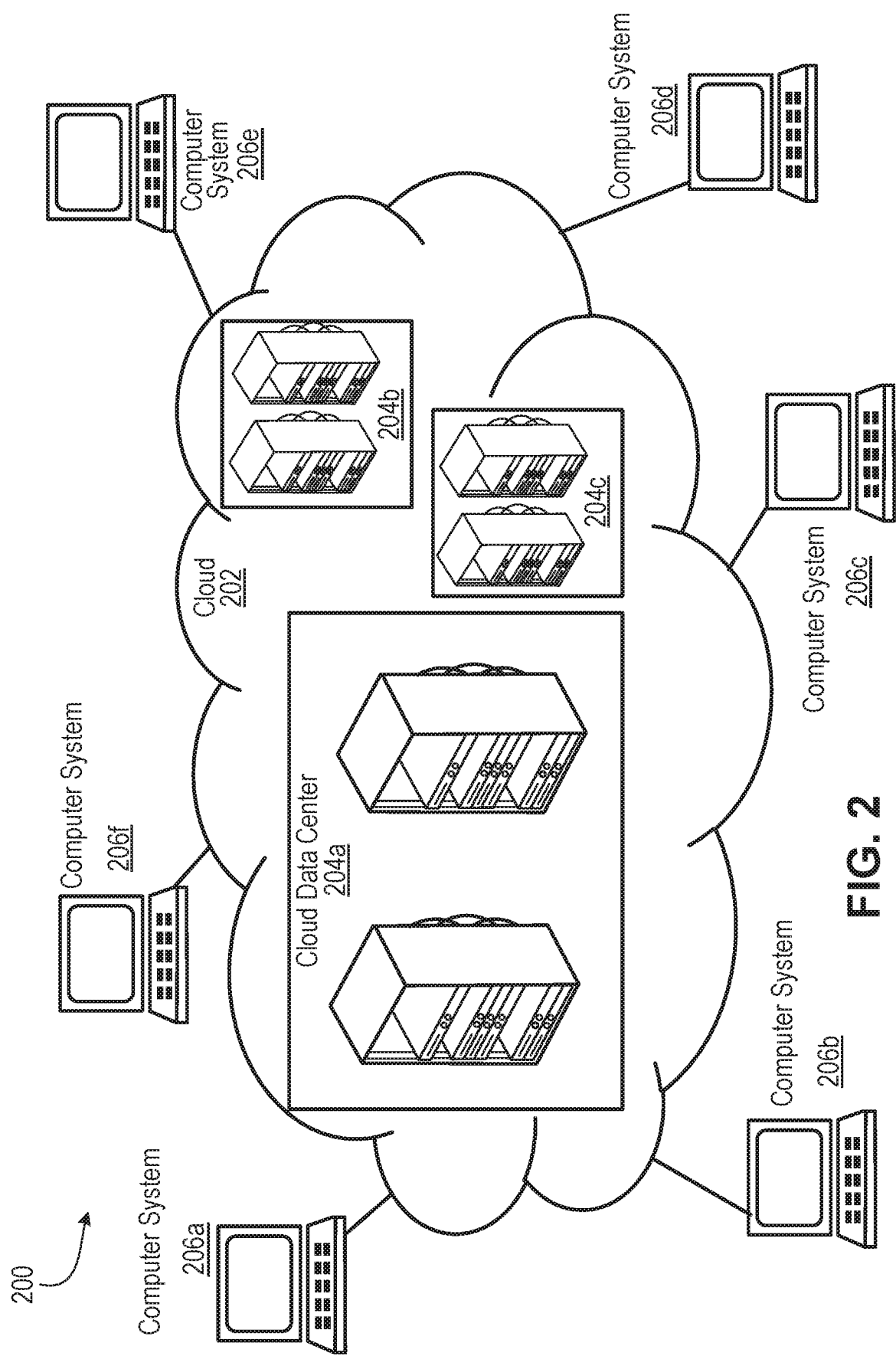
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g., networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
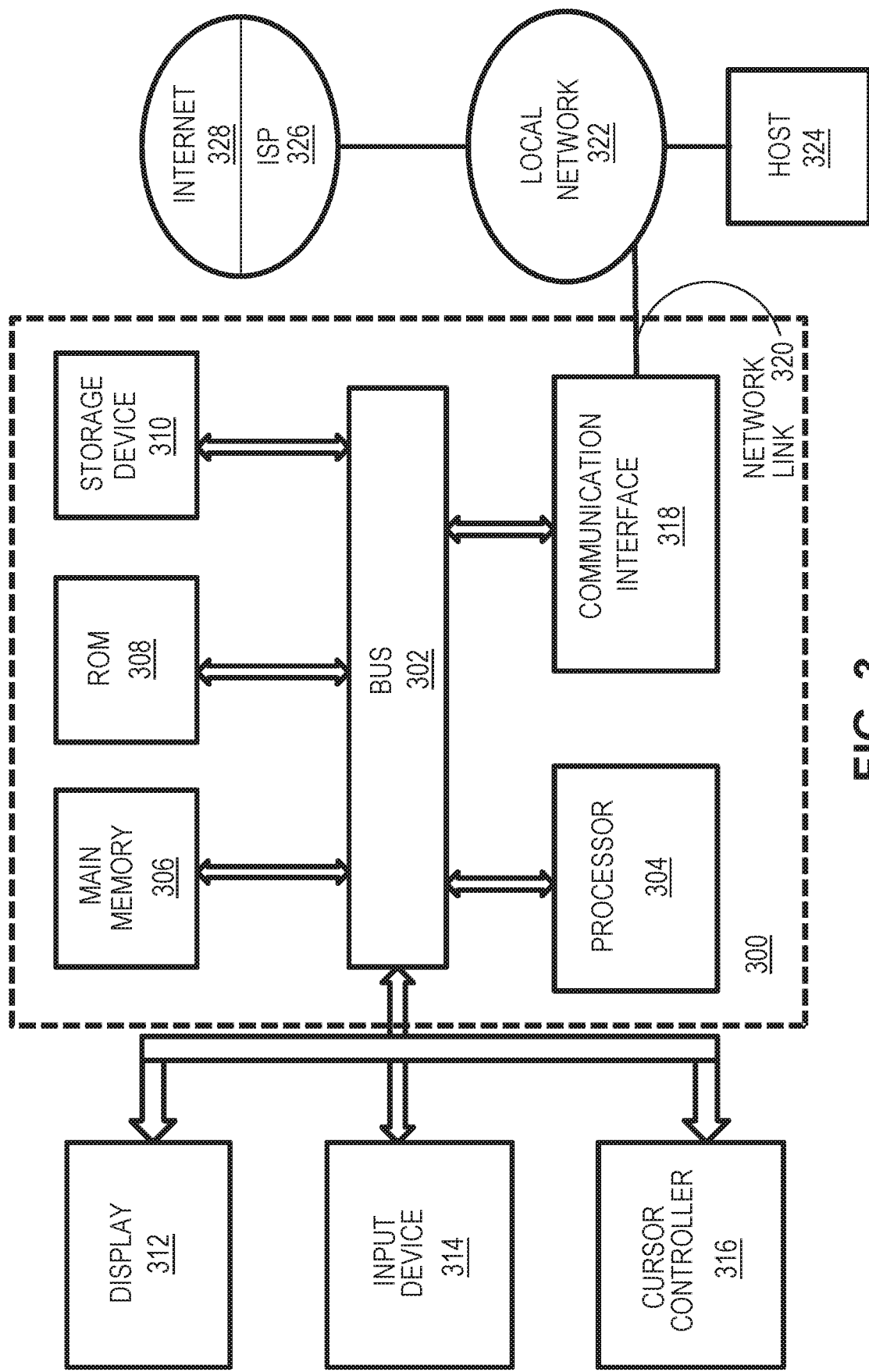
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
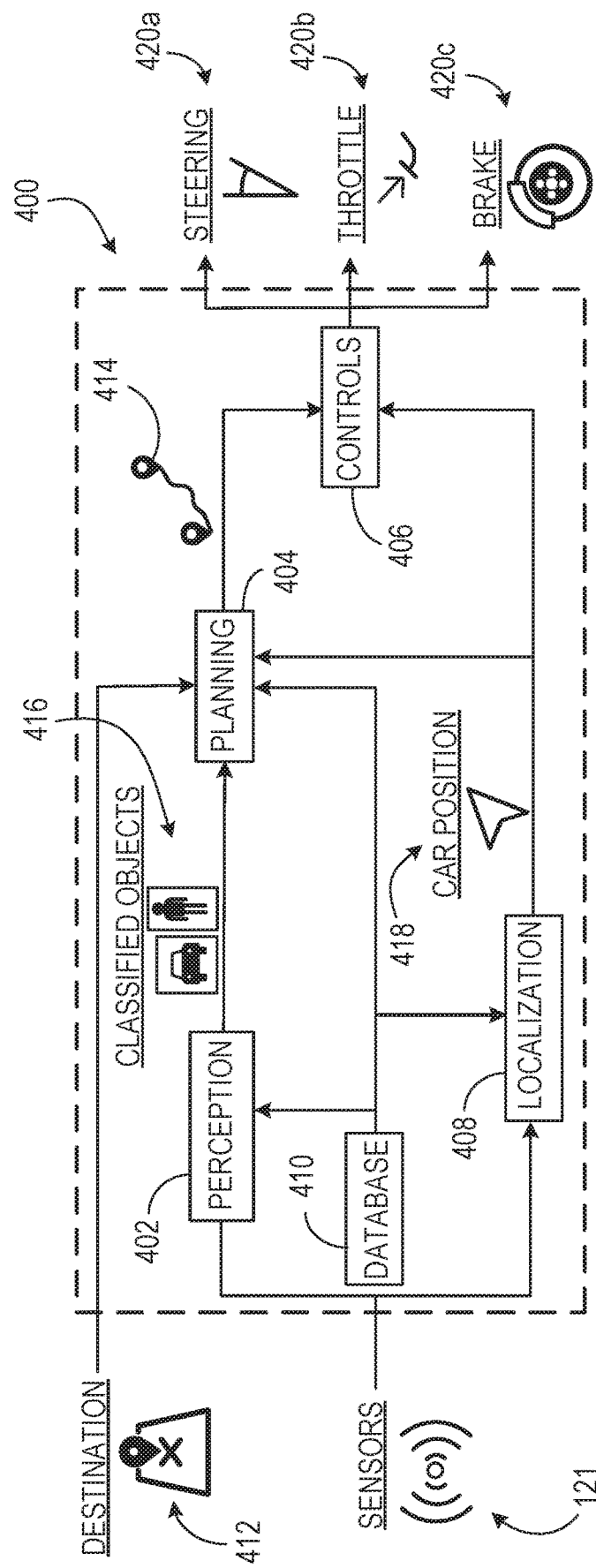
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
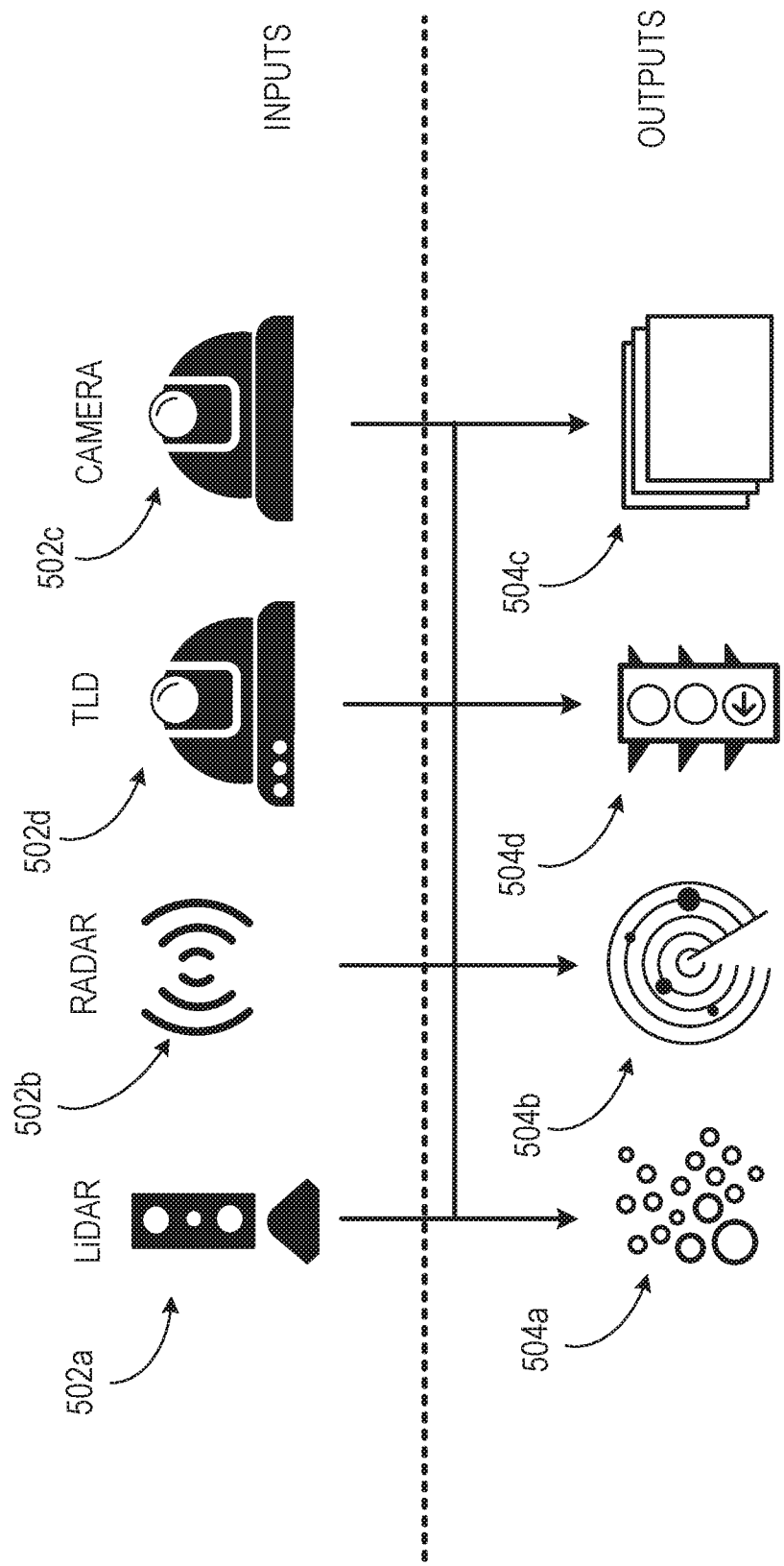
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
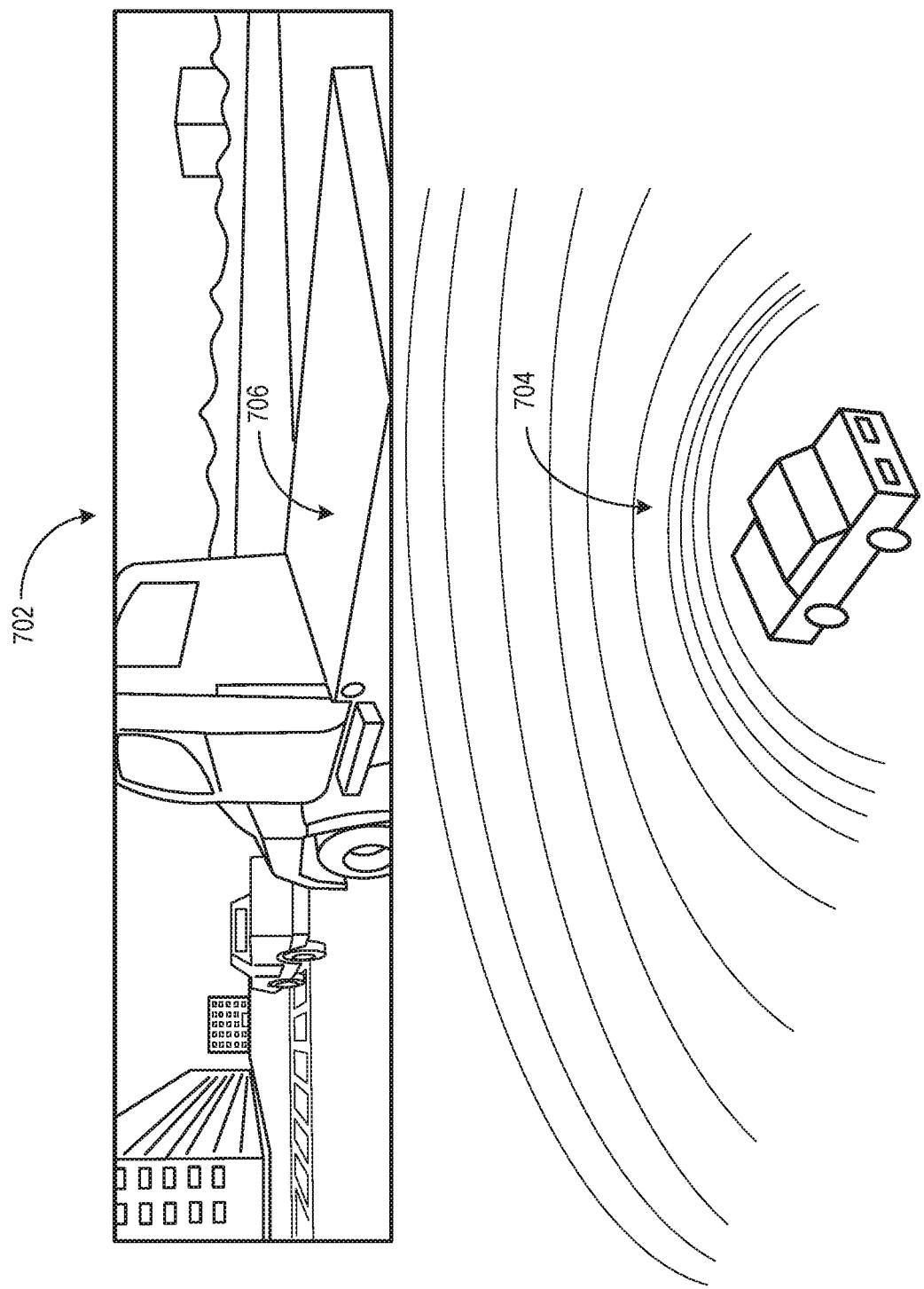
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
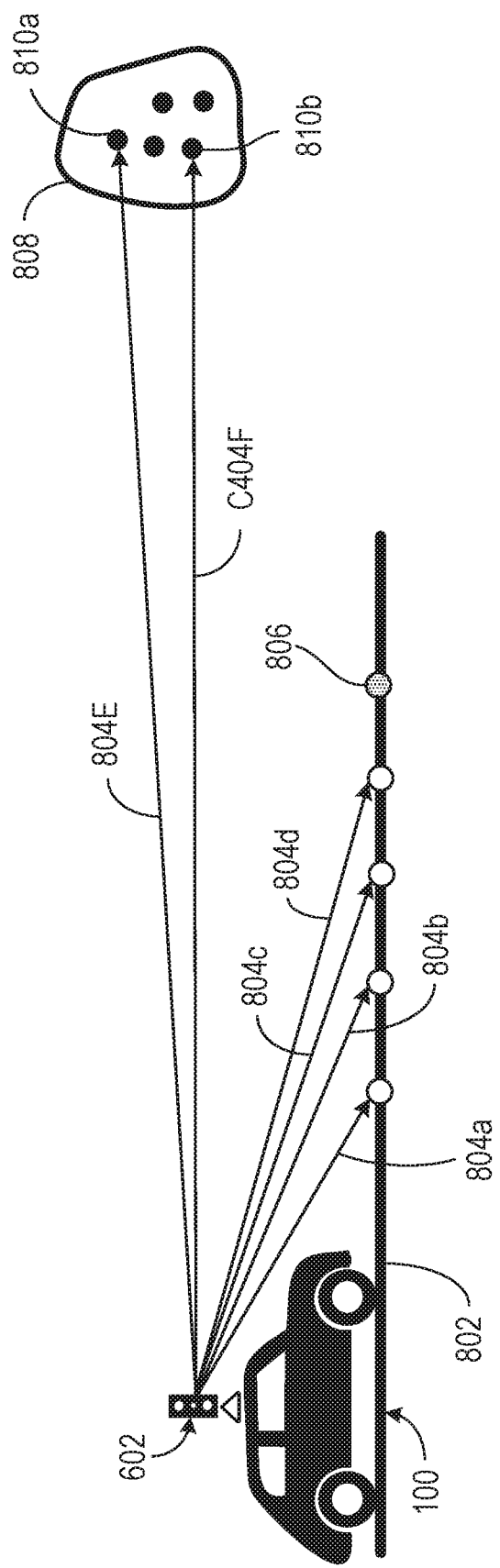
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
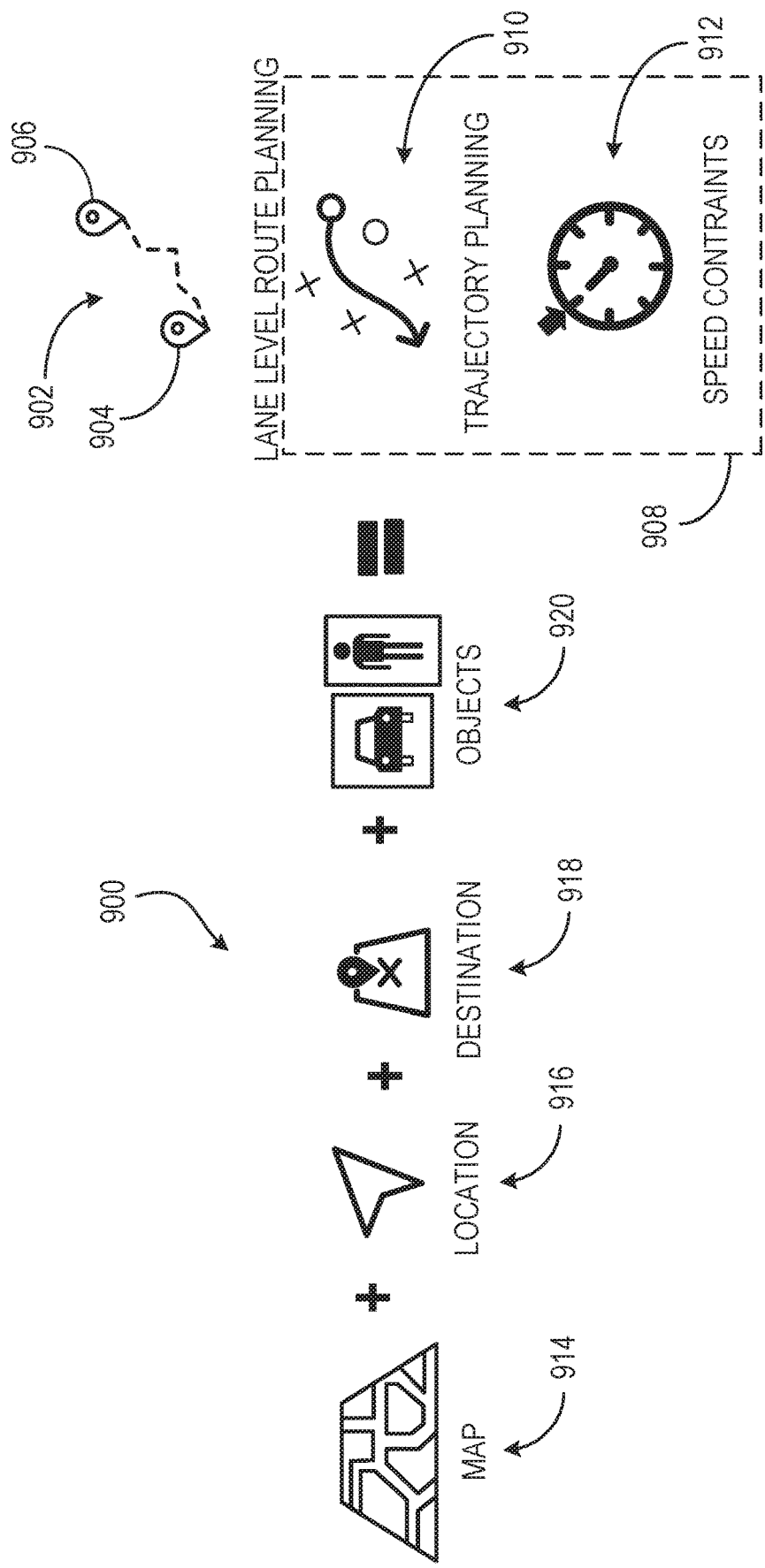
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
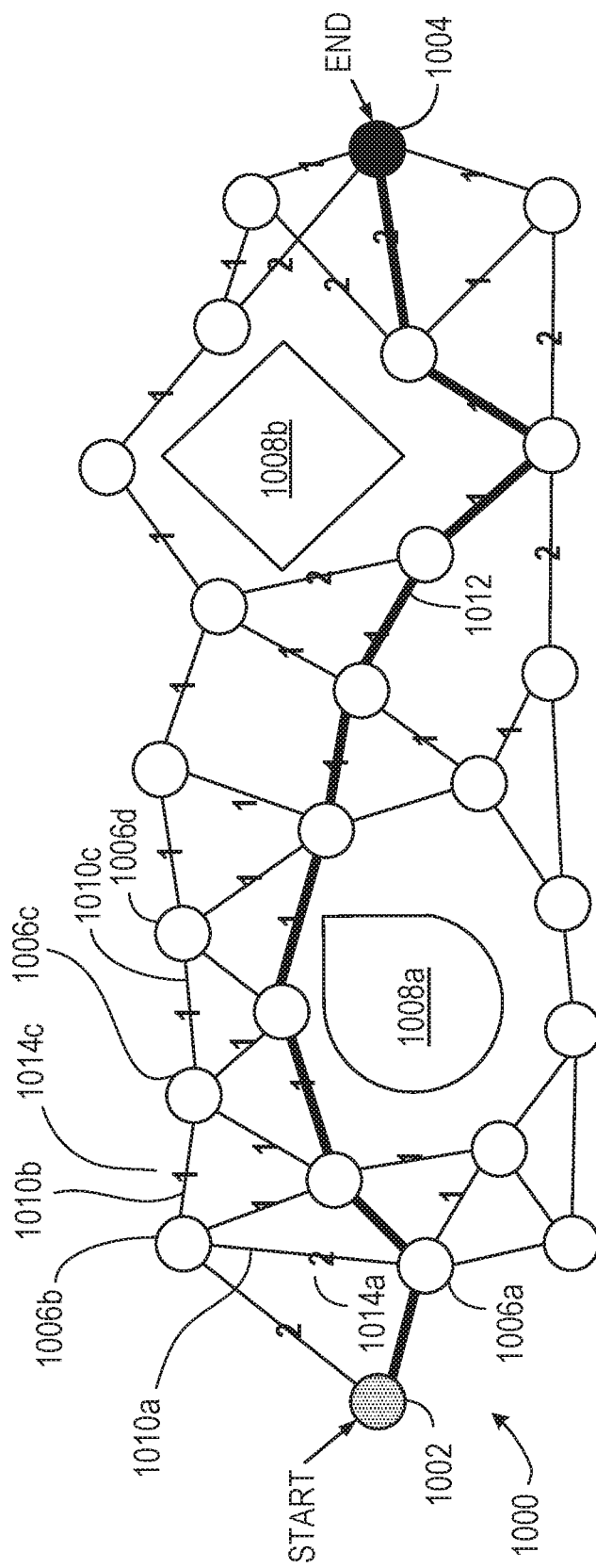
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g, in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006*a* and the other node 1006*b*, e.g., without having to travel to an intermediate node before arriving at the other node 1006*b*. (When we refer to an AV 100 traveling between nodes, we mean that the AV 100 travels between the two physical positions represented by the respective nodes.) The edges 1010*a-c* are often bidirectional, in the sense that an AV 100 travels from a first node to a second node, or from the second node to the first node. In an embodiment, edges 1010*a-c* are unidirectional, in the sense that an AV 100 can travel from a first node to a second node, however the AV 100 cannot travel from the second node to the first node. Edges 1010*a-c* are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010*a-c* has an associated cost 1014*a-b*. The cost 1014*a-b* is a value that represents the resources that will be expended if the AV 100 chooses that edge. A typical resource is time. For example, if one edge 1010*a* represents a physical distance that is twice that as another edge 1010*b*, then the associated cost 1014*a* of the first edge 1010*a* may be twice the associated cost 1014*b* of the second edge 1010*b*. Other factors that affect time include expected traffic, number of intersections, speed limit, etc. Another typical resource is fuel economy. Two edges 1010*a-b* may represent the same physical distance, but one edge 1010*a* may require more fuel than another edge 1010*b*, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
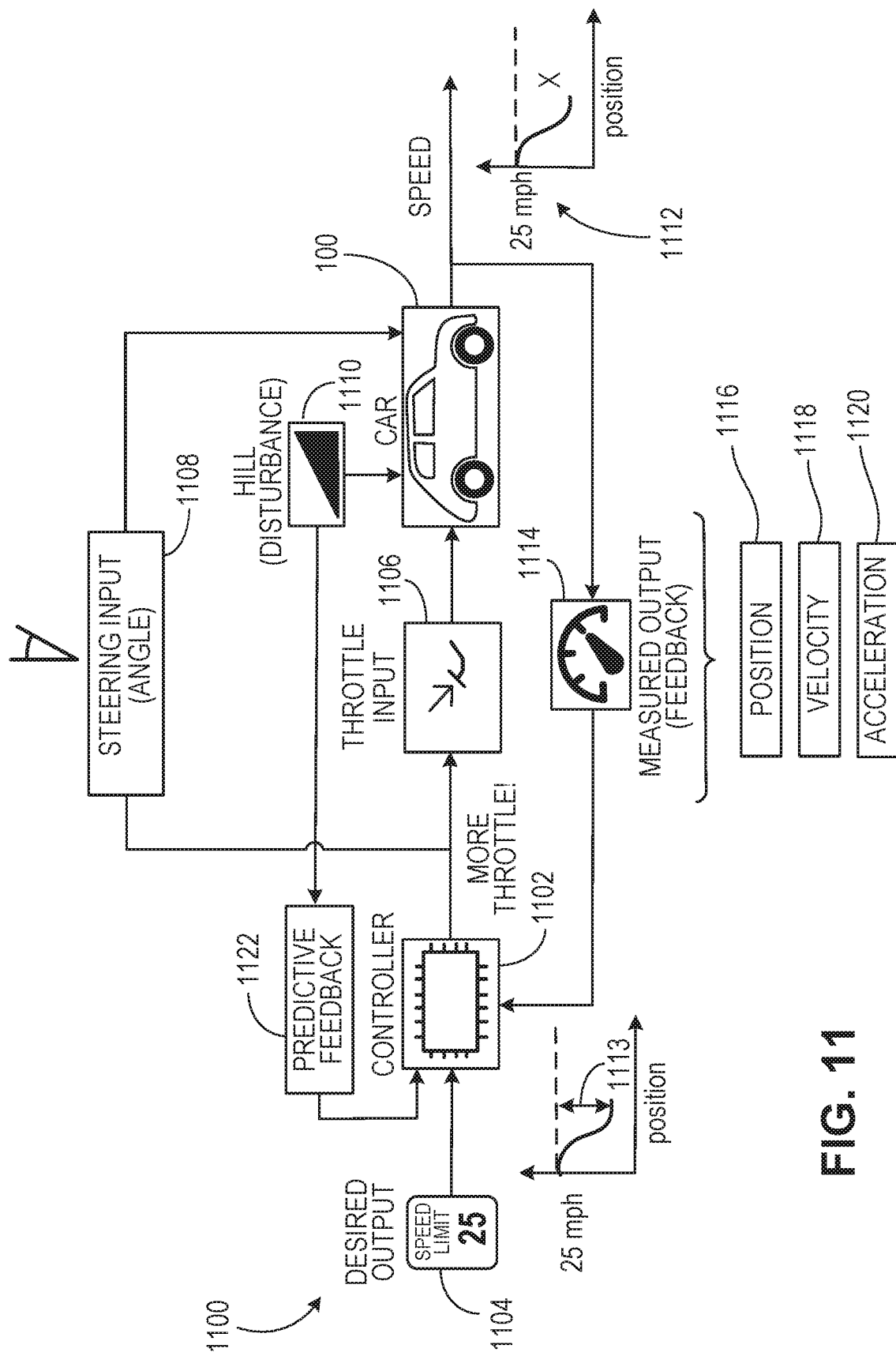
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
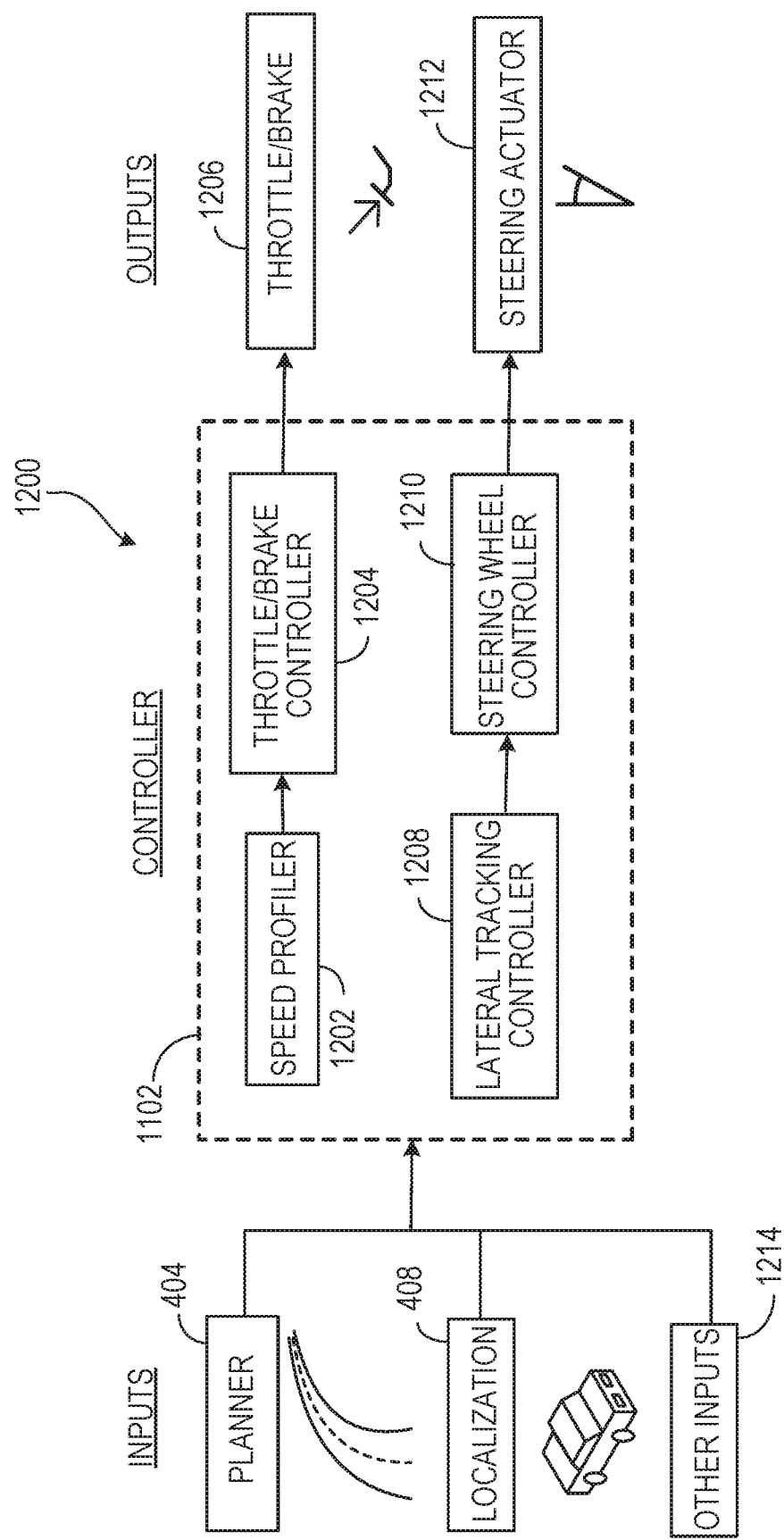
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Autonomous Vehicle Ride-Hailing Service

Figure 13:
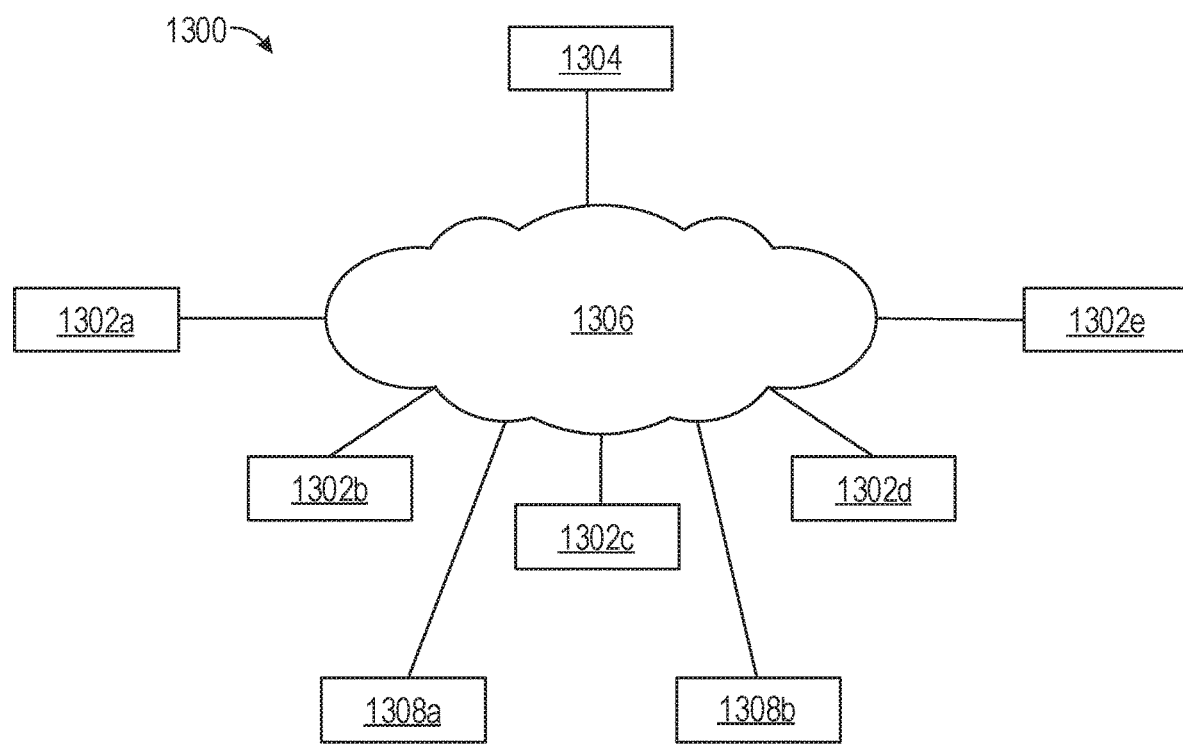
FIG. 13 illustrates an example of an autonomous vehicle ride-hailing network.

FIG. 13 shows an example AV ride-hailing network 1300 that is similar to cloud computing environment 200. Ride-hailing network 1300 is a system or network for implementing a ride-hailing service for AVs. Ride-hailing network 1300 includes autonomous vehicles (AVs) 1302*a*-1302*e* and command center 1304, which are interconnected via cloud 1306. Ride-hailing network 1300 facilitates ride-hailing services in which users can request a ride from an initial location to a destination location using one of AVs 1302*a*-1302*e*.

Each AV 1302 corresponds to a respective AV (e.g., AV 100) operating in ride-hailing network 1300 and includes an electronic device (e.g., similar to computer system 300) that is associated with the respective AV. The electronic device is configured, in some embodiments, such that a user can interact with the AV and other elements of ride-hailing network 1300 (such as, for example, command center 1304) using the electronic device. For example, the electronic device can include a touch-sensitive display capable of displaying content and detecting user input. In some embodiments, the electronic device is configured to facilitate communication (e.g., voice communication, video communication) with elements of ride-hailing network 1300 including, for example, other AVs 1302*a*-1302*e*, command center 1304, cloud 1306, and user nodes 1308*a*-1308*b*. For the sake of simplicity, the electronic device associated with a respective AV is often referred to here as a display of the respective AV. It should be appreciated, however, that the electronic device includes capabilities beyond merely displaying content, as discussed above.

Command center 1304 includes an electronic device (e.g., similar to computer system 300) that coordinates operation of the ride-hailing services provided by ride-hailing network 1300. Accordingly, command center 1304 corresponds to an entity (e.g., a command center, a dispatch center, etc.) controlling operation of the ride-hailing services provided by ride-hailing network 1300. Non-limiting examples of functions provided by command center 1304 can include coordinating ride requests from users; managing logistical operations such as dispatching, rerouting, and tracking AVs 1302*a*-1302*e*; providing rider/passenger authentication/authorization; facilitating communications (e.g., text messages, chat sessions, phone calls, video communications, social media interaction, etc.) with users and other parties (e.g., emergency services); performing troubleshooting and maintenance; providing billing and payment services; managing user accounts for the ride-hailing service; and providing other services related to operating and managing the ride-hailing service.

Ride-hailing network 1300 is configured to communicate with one or more user nodes 1308*a*-1308*b*, which represent electronic devices (e.g., similar to computer system 300) that are associated with user accounts configured to use the ride-hailing services provided by ride-hailing network 1300. For example, user node 1308*a* or 1308*b* can include a smartphone having a touch-sensitive display and associated with a user account that is registered with a ride-hailing service implemented using ride-hailing network 1300. A user can interact with ride-hailing network 1300 through the electronic device associated with the respective user node 1308 (e.g., using an Internet browser or application operating on the user's smartphone). For example, the user can request use of an AV (e.g., one of AVs 1302*a*-1302*e*), manage account information, contact command center 1304, contact a dispatched AV (e.g., AV 1302*a*), and perform other operations as discussed herein. For the sake of simplicity, the electronic device associated with a respective user node 1308*a*/1308*b* is often referred to herein as the user's smartphone. It should be appreciated, however, that other electronic devices can be used such as, for example, a tablet or laptop.

Figure 14:
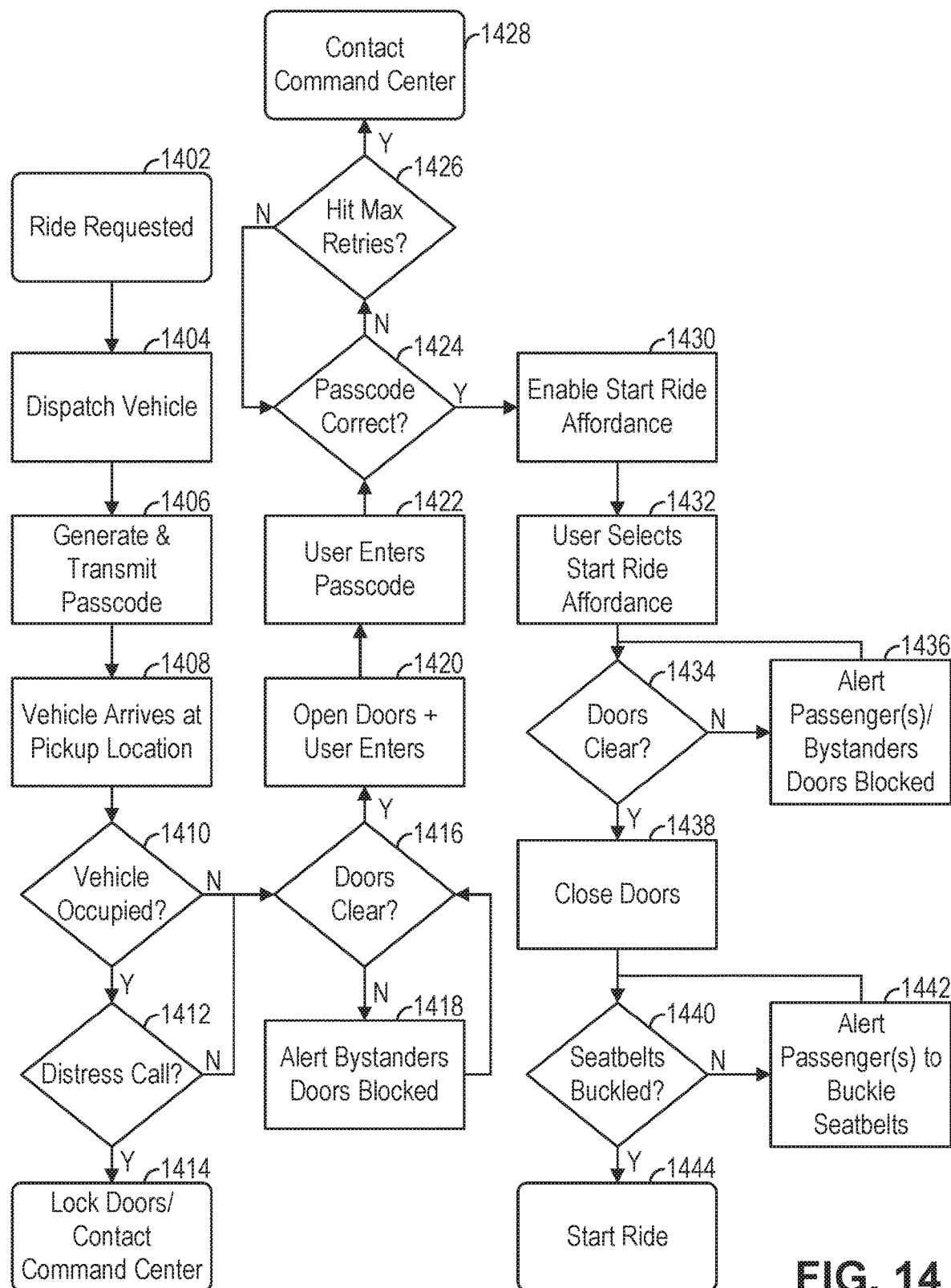
FIG. 14 is a flow chart of an example process for fulfilling a request for ride-hailing services using an autonomous vehicle ride-hailing network.

FIG. 14 is a flow chart of an example process 1400 for fulfilling a request for ride-hailing services using ride-hailing network 1300. For convenience, the process 1400 is described as being performed by a system of one or more computers located in one or more locations. For example, the computing system represented in ride-hailing network 1300 of FIG. 13, appropriately programmed in accordance with this specification, can perform the process 1400. As such, various operations described herein can be performed across one or more locations including AVs 1302*a*-1302*e*, command center 1304, cloud 1306, and user nodes 1308*a*-1308*b*. In some embodiments, some operations in process 1400 are, optionally, combined, the orders of some operations are, optionally, changed, and some operations are, optionally, omitted.

At 1402, the system (e.g., ride-hailing network 1300) receives a request for ride-hailing service. In some embodiments, the request is initiated by a user account that is authorized to request ride-hailing services from ride-hailing network 1300. For example, the request can be initiated by a user account associated with user node 1308*a* (e.g., using an application operating on a smartphone), and the request is received at command center 1304. In some embodiments, the request includes data identifying the user, the number of passengers (and, optionally, identifying information for the passengers), whether the user has luggage, a location for pickup, and a destination location. In some embodiments, the request can include other information such as, for example, preferences for the AV (e.g., a preferred temperature for the cabin of the AV, a preferred song played on the stereo, a preferred make/model of AV, preferences for sharing a ride with other passengers, etc.), and a requested pickup time.

At 1404, command center 1304 dispatches an AV (e.g., AV 1302*a*) to a location specified by the request received from user node 1308*a*.

At 1406, command center 1304 generates a passcode (e.g., a one-time password that is valid for only one login session or transaction), and transmits the passcode to dispatched AV 1302*a* and user node 1308*a*. In some embodiments, the passcode is used to authenticate the user so that the user can complete the ride-hailing process using AV 1302*a*, as discussed in greater detail below.

At 1408, dispatched AV 1302*a* arrives at the specified pickup location. In some embodiments, the system enables user-controlled actions to assist the user in identifying AV 1302*a*. For example, in some embodiments, the user can interact with the application on the user's smartphone to control AV 1302*a* to blink its lights, honk the horn, play a particular song on its stereo, or display a particular word or color on a display panel (e.g., an external display panel) viewable on the AV. In some embodiments, AV 1302*a* and/or command center 1304 controls performance of one or more of these actions, and then provides the user with relevant information to identify the vehicle. For example, the system can select a unique word for display on AV 1302*a*, and the unique word is transmitted to the user's smartphone so that the user can locate AV 1302*a* using the unique word received at their smartphone (e.g., user node 1308*a*).

At 1410, the system determines whether dispatched AV 1302*a* is occupied. In some embodiments, this determination can be made using one or more sensors in AV 1302*a* to detect the presence of a person. In some embodiments, the user can indicate the presence of an occupant in the vehicle (e.g., using the application on the user's smartphone). In some embodiments, the determination can be made based on data indicating a use history for AV 1302*a*. For example, the use history data can indicate that a current passenger of AV 1302*a* is enroute to a destination. This situation may occur in the event the user associated with user node 1308*a* has agreed to share a ride with the current passenger.

At 1412, the system determines whether a distress call (e.g., a panic button) has been initiated. For example, the user can initiate a distress call using the application on the user's smartphone. As another example, the current passenger can initiate the distress call using the display of AV 1302a.

At 1414, if the distress call is initiated, the doors of AV 1302a are locked and a call is initiated to command center 1304 or to an emergency service provider such as a local police or fire department. In some embodiments, the call is placed using the user's smartphone (e.g., if the user initiated the distress call from their device). In some embodiments, the call is placed using the electronic device associated with AV 1302a (e.g., if the current passenger initiated the distress call).

At 1416, AV 1302a determines whether the opening/closing path of one or more doors of AV 1302a are unobstructed. In some embodiments, this includes determining whether the environmental conditions of the vehicle are safe for operating the doors. For example, one or more sensors (e.g., sensors 121) of AV 1302a can detect whether the opening/closing path of the door is obstructed or whether there are objects nearby including, for example, oncoming traffic (e.g., pedestrians, cars, bikes, etc.), parked cars, bikes, street signs, pedestrians, trashcans, or other items.

In some embodiments, determining whether the opening/closing path of a door can include determining whether partial opening of the door is possible or desirable. If partial door opening is possible, the system can prompt the user to indicate whether the user would rather use the partially opened door or wait for the door obstruction condition to resolve (e.g., waiting for AV 1302a to travel to a different location or waiting for removal of an obstructing object such as, for example, waiting for a bike, pedestrian, or other obstructing object to move away from the door of AV 1302a).

At 1418, if the opening/closing path of a door is obstructed, the system alerts bystanders (e.g., including the user) that one or more doors of AV 1302a are obstructed. In some embodiments, this is an audible communication generated at the electronic device associated with AV 1302a. In some embodiments, the alert is generated at the electronic device associated with user node 1308a. In some embodiments, if an object obstructing the door path is stationary or otherwise is not removed, AV 1302a drives a short distance to provide sufficient spacing from the obstructing object.

At 1420, once the pathway of the door of AV 1302a is clear, the system automatically opens the door of AV 1302a to allow the user to enter AV 1302a and/or to allow the current passenger to exit the vehicle. Allowing the user to enter AV 1302a prior to authentication provides the user with a safe environment to perform the authentication process.

In some embodiments, AV 1302a automatically opens doors that are determined to be both safe for opening and desirable for use. Thus, in some embodiments, AV 1302a does not open a door of AV 1302a if the door is not determined to be safe for opening or if it is not determined to be desirable for use. In some embodiments, the system can determine a door of AV 1302a to be safe for opening based on environmental conditions surrounding AV 1302a. For example, if the sensors of AV 1302a (e.g., sensors 121) detect the presence of oncoming traffic near a respective door, nearby objects (e.g., cars, bikes, pedestrians, etc.), or objects obstructing an opening/closing path of the door, the system determines the respective door to be unsafe for use, otherwise the door is considered to be safe. In some embodiments, the user can indicate a respective door is unsafe for use by, for example, interacting with the application on the user's smartphone or the display of AV 1302a (e.g., marking the door as unsafe in the application or initiating a distress call). In some embodiments, the system determines a door of AV 1302a to be desirable for use based on various factors. Non-limiting examples of such factors include locations of passengers in AV 1302a, presence of items in a cargo region (e.g., the trunk) of AV 1302a, proximity of a passenger relative to a door, and whether a passenger or user has requested use of the door. For example, a door can be considered desirable for use if the door is the closest door to a passenger. As another example, if the system determines that cargo is stored in the cargo region of AV 1302a, the rear door (e.g., trunk lid or rear hatch) of AV 1302a is considered desirable for use so that the user can retrieve their cargo. Additional details of one or more embodiments for operating a door of AV 1302a are discussed below with respect to FIG. 16.

In some embodiments, if the system determines that a door is unsafe for operation, the system notifies the user of the unsafe condition of the door. For example, the system can display (e.g., on the user's smartphone, the display of AV 1302a, or both) a visual warning that the door is unsafe such as a text notification and/or a displayed representation (e.g., an overhead or map view) of AV 1302a indicating which doors of the vehicle are safe/unsafe for use. In some embodiments, the notification can include an audio component notifying the user of safe/unsafe doors using a speaker of the user's smartphone or AV 1302a. In some embodiments, the system will communicate similar warnings to the user if the user attempts to operate a door that is determined to be unsafe.

In some embodiments, after the passengers enter AV 1302a, the system detects the number of passengers in the vehicle and evaluates whether the number of detected passengers is consistent with the number of riders (e.g., passengers) indicated in the ride request received at 1402. In some embodiments, if the number of detected passengers is inconsistent with the number of riders indicated in the request, the system contacts the user to resolve the inconsistency. For example, command center 1304 can contact the user via the user's smartphone or the display in AV 1302a to initiate a communication session (e.g., call, chat, text message, video communication session, etc.) or display a user interface prompting the user to confirm the number of riders. In some embodiments, this process can involve resolving any financial consequences of adjusting the number of requested riders. For example, the system can prompt the user to accept a revised rate for riding in AV 1302a with the confirmed number of passengers. It should be appreciated that this process can occur at any time in which the number of passengers in AV 1302a is inconsistent with the number of passengers the system expects in AV 1302a.

At 1422, the system authenticates the user. In some embodiments, the user is authenticated using the passcode transmitted to the user at 1406. For example, the user enters the passcode in a passcode entry field displayed on the user's smartphone, the display of AV 1302a, or both.

At 1424, the system determines whether the entered passcode is correct. If the passcode entered by the user does not match the passcode generated at 1406, the system checks, at 1426, whether the user has reached a maximum number of allowed attempts to enter the passcode. If the user has not reached the maximum number of allowed attempts, the user is again permitted to attempt entry of the passcode at 1424. This process continues until the maximum number of attempts is reached or the user enters the correct passcode.

At 1428, when the user reaches the maximum number of attempts, the system initiates a call to command center 1304 to resolve the passcode entry process. In some embodiments, the call is placed using the user's smartphone. In some embodiments, the call is placed using the electronic device associated with AV 1302*a*.

If the passcode entered by the user matches the passcode generated at 1406, or the passcode entry process is otherwise resolved (e.g., via phone call to command center 1304), the system authenticates the user and authorizes the user as a passenger of AV 1302*a*. Once the user is authorized as a passenger, the system permits the user to continue with the ride-hailing process and to interact with other features of AV 1302*a*, as discussed in greater detail below.

In some embodiments, the user authentication process described above can be performed using a facial recognition process in lieu of, or in addition to, the passcode entry process. For example, the user's smartphone or the electronic device associated with AV 1302*a* can include sensors capable of scanning the user's face to perform facial recognition of the user. After the device scans the user's face, facial data generated from the facial scan is compared to a profile picture of the user that is associated with the user's account with ride-hailing network 1300. If the facial data indicates a match with the user's profile picture, the user is authenticated and authorized to ride in AV 1302*a*.

At 1430, after the user is authorized as a passenger of AV 1302*a*, the system enables display of an affordance that is selectable to initiate departure from the initial location. For example, in some embodiments, the affordance is displayed as a "start ride" affordance that is displayed on the user's smartphone, the display of AV 1302*a*, or both. Prior to user authorization, the affordance is not displayed, and the user is unable to initiate departure.

At 1432, the system detects selection of the affordance. This can include detecting a user input on the affordance displayed on the user's smartphone or the display in AV 1302*a*.

At 1434, the system determines whether the opening/closing path of one or more doors of AV 1302*a* are unobstructed, similar to the process described above with respect to 1416.

At 1436, if the opening/closing path of a door is obstructed, the system alerts bystanders and passengers in AV 1302*a* (e.g., including the user) that one or more doors of AV 1302*a* are obstructed, similar to the process described above with respect to 1418.

At 1438, once the pathway of the door of AV 1302*a* is clear, the system automatically closes the doors.

At 1440, the system performs a passenger safety check including, for example, determining whether all passengers in AV 1302*a* are restrained by a seatbelt. If one or more passengers are not safely restrained by a seatbelt, the system alerts the passengers (e.g., via the user's smartphone and/or the display in AV 1302*a*) to buckle up at 1442.

At 1444, the system initiates departure of AV 1302*a* once the safety check is satisfied.

It should be appreciated that, upon arrival at the destination location, one or more of the above steps can be performed to allow the passengers to exit AV 1302*a* and complete the ride. For example, the system performs the steps discussed above with respect to steps 1410-1420, including evaluating whether doors are safe and/or desirable for operation to let the passengers exit AV 1302*a* and close the doors prior to departure. In some embodiments, when all passengers have exited AV 1302*a*, all doors are evaluated for safe operation before closing, and the user is prompted to confirm completion of the ride, including optionally confirming via the user's smartphone that no passengers or cargo remain in AV 1302*a*. After the user confirms the ride is completed, AV 1302*a* departs from the destination location, for example, returning to a storage location or command center 1304 or proceeding to pick up a different user.

Example Process for Authenticating a Passenger for Pick-Up

Figure 15:
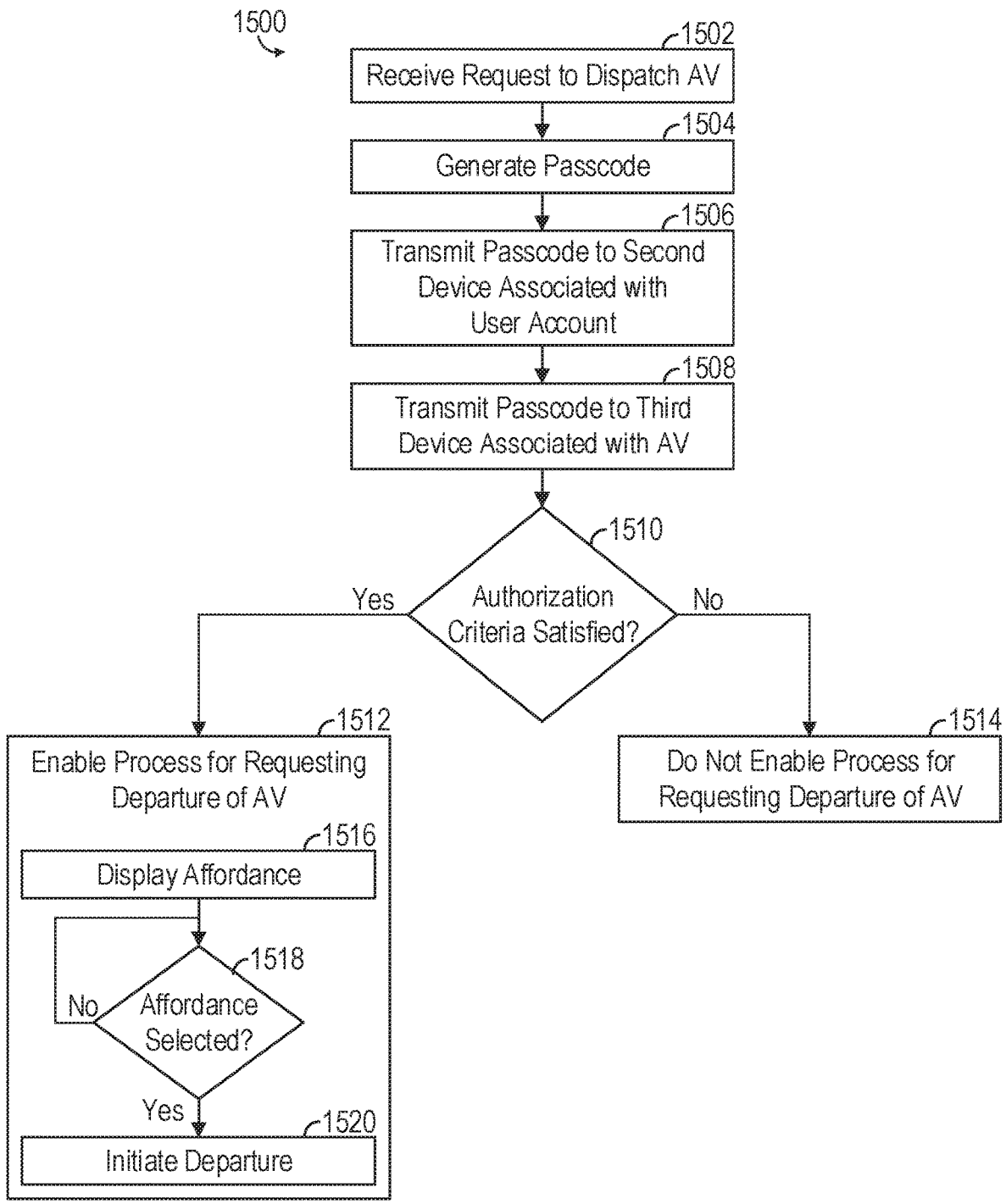
FIG. 15 is a flow chart of an example process for authenticating a passenger for pick-up.

FIG. 15 is a flow chart of an example process 1500 for authenticating a passenger for pick-up. For convenience, the process 1500 will be described as being performed by a system of one or more computers located in one or more locations. For example, the computing system represented in ride-hailing network 1300 of FIG. 13, appropriately programmed in accordance with this specification, can perform the process 1500. As such, various operations described herein can be performed across one or more locations including AVs 1302*a*-1302*e*, command center 1304, cloud 1306, and user nodes 1308*a*-1308*b*. In some embodiments, the process 1500 can be implemented in process 1400, for example, as a sub-process of process 1400. In some embodiments, some operations in process 1500 are, optionally, combined, the orders of some operations are, optionally, changed, and some operations are, optionally, omitted.

At 1502, the system (e.g., ride-hailing network 1300) receives a request to dispatch an AV (e.g., AV 1302*a*). In some embodiments, the request is received at an electronic device associated with command center 1304, AV 1302*a*-1302*e*, and/or cloud 1306. In some embodiments, the request is received directly or indirectly from an electronic device associated with a user account (e.g., a user's smartphone associated with user node 1308*a* or 1308*b*).

In some embodiments, the request to dispatch the autonomous vehicle includes an indication of a number of expected passengers (e.g., occupants of the vehicle) for riding in the AV (e.g., AV 1302*a*). In some embodiments, the authorization criteria for the user account includes a second criterion that is satisfied when a number of passengers detected in the AV matches the number of expected passengers, and the process further comprises: in accordance with a determination that the authorization criteria for the user account is not satisfied because the number of passengers detected in the AV does not match the number of expected passengers, initiating a process for rectifying passenger count. In some embodiments, the process for rectifying passenger count includes prompting the user to confirm the number of passengers in the AV. For example, if the number of passengers detected in the AV is greater/less than the number of expected passengers, the first electronic device prompts the second electronic device (e.g., the user's electronic device associated with user node 1308*a*) to display a user interface for confirming the number of passengers in the AV and accepting a revised rate for riding in the AV with the confirmed number of passengers (e.g., increased rate for a greater number of passengers than expected; decreased rate for a lesser number of passengers than expected). In some embodiments, the process for rectifying passenger count includes prompting the second electronic device to display one or more options for requesting assistance. For example, an option for requesting assistance can include an affordance that, when selected, contacts the dispatch service (e.g., command center 1304). This option can be useful for enabling the user to communicate with the dispatch service to resolve any issues associated with the ride service. As another example, an option for requesting assistance can include an affordance that, when selected, contacts emergency services such as a local police department. This option can be useful for enabling the user to request assistance from emergency services to resolve a safety concern such as, for example, an unwanted passenger entering the AV with the user.

In response to receiving the request to dispatch an AV, process 1500 includes the following items. At 1504, the system (e.g., ride-hailing network 1300) generates a passcode (e.g., a one-time password) (e.g., a randomly generated code). At 1506, the system transmits the passcode to a second electronic device (e.g., a user's mobile device associated with user node 1308*a*) associated with a user account (e.g., a user account that is requesting use of the AV). At 1508, the system transmits the passcode to a third electronic device associated with an AV (e.g., an electronic device (similar to computer system 300) that is associated with AV 1302*a*). In some embodiments, transmitting the passcode to the third electronic device associated with the AV includes dispatching the AV to a location associated with the user account (e.g., a pickup location).

In some embodiments, process 1500 further comprises: after receiving the request to dispatch the AV (e.g., AV 1302*a*), enabling one or more actions to be performed at the AV (e.g., actions to assist a user to identify the AV such as, for example, blinking one or more lights of the AV, honking the AV's horn, displaying a specific color on a display of the AV, and/or playing a specific song over the AV's stereo speakers). In some embodiments, as a part of enabling the one or more actions to be performed at the AV, the process 1500 includes one or more of the following items: receiving (e.g., at ride-hailing network 1300) (e.g., directly or indirectly from the second electronic device associated with the user account) a request to perform a first action; in accordance with a determination that the request satisfies a first set of criteria, wherein the first set of criteria includes a criterion that is satisfied when the request is initiated by the user account, performing, at the AV, the first action; and in accordance with a determination that the request does not satisfy the first set of criteria, forgoing performing the first action.

In some embodiments, the process 1500 further comprises, after receiving the request to dispatch the AV, enabling display of a text-identifier (e.g., a unique word that is used to assist the user in identifying the AV) at a display device associated with the third electronic device (e.g., a display device of AV 1302*a*), and transmitting a copy of the text-identifier to the second electronic device associated with the user account. In some embodiments, the copy of the unique word is transmitted to the electronic device of the user so the user can quickly and accurately identify the AV by matching the unique word on the display device of the AV with the copy of the unique word transmitted to the electronic device of the user.

In some embodiments, the process 1500 further comprises, prior to determining whether authorization criteria for the user account is satisfied, in accordance with a determination that a first set of location-based criteria are met (e.g., the AV 1302*a* is located at a predefined location (e.g., a pick-up location); the AV is co-located with the user (e.g., a location associated with the user account)), permitting access to an interior region of the AV; and in accordance with a determination that the first set of location-based criteria are not met, restricting access to the interior region of the AV. In some embodiments, access to the interior of the AV is permitted (e.g., the AV's doors are unlocked) when the AV has arrived at a predetermined location or is co-located with the user, even if the user has not yet entered the passcode. This permits the user to enter the AV, which can provide a safe location to enter the passcode. Once the user has entered the AV, the user can provide the passcode using, for example, the electronic device associated with the user account or a user interface displayed in the interior region of the AV.

At 1510, the system (e.g., ride-hailing network 1300) determines whether authorization criteria (e.g., authentication criteria) for the user account is satisfied, the authorization criteria for the user account including a first criterion that is satisfied when a user provides the passcode. In some embodiments, the user provides the passcode by entering the passcode using the second electronic device (e.g., the electronic device associated with user node 1308*a*). In some embodiments, the user provides the passcode by entering the passcode using the third electronic device (e.g., the electronic device associated with AV 1302*a*).

At 1512, if the system determines the authorization criteria is satisfied, the system (e.g., ride-hailing network 1300) enables a process for requesting departure of the AV (e.g., AV 1302*a*). At 1514, if the system determines that the authorization criteria is not satisfied, the system forgoes enabling the process for requesting departure of the AV. In some embodiments, forgoing enabling the process for requesting departure of the AV includes initiating contact (e.g., a phone call, a video call, or a chat session initiated via the first electronic device (e.g., using the second or third electronic device)) with an entity associated with the first electronic device (e.g., a dispatch service, a customer-support center (e.g., command center 1304)).

In some embodiments, the authorization criteria for the user account includes a third criterion that is satisfied when a face (e.g., the user's face) is authorized (e.g., authenticated) using a facial recognition process. In some embodiments, the facial recognition process includes one or more of the following items: detecting (e.g., via a camera associated with the second electronic device or the third electronic device) facial characteristics of the face; comparing the facial characteristics of the face to a facial profile (e.g., a photograph of the user associated with the user account) associated with the user account; in accordance with a determination that a threshold amount of the facial characteristics of the face match the facial profile associated with the user account (e.g., a threshold number of facial characteristics of the face are identical or substantially similar to facial characteristics associated with the facial profile), authorizing the face (e.g., authorizing the user); and in accordance with a determination that a threshold amount of the facial characteristics of the face do not match the facial profile associated with the user account, forgoing authorizing the face (e.g., forgoing authorizing the user).

The process for requesting departure of the AV (e.g., AV 1302*a*) includes one or more of the following items. At 1516, the system (e.g., ride-hailing network 1300) displays, via a display device (e.g., displaying on a display in the AV, enabling display on a display of the second electronic device, or both), an affordance corresponding to a request to initiate departure of the AV (e.g., enabling display of a "start ride" affordance). At 1518, the system determines whether the affordance has been selected. At 1520, in response to a determination that the affordance has been selected, the system initiates departure of the AV.

In some embodiments, initiating departure of the AV (e.g., AV 1302*a*) includes: determining whether any objects are obstructing any open doors of the autonomous vehicle, automatically closing one or more open doors, and determining whether each passenger is restrained by a seatbelt.

In some embodiment, process 1500 further comprises: in accordance with a determination that one or more doors of the AV (e.g., AV 1302a) are not closed or one or more passengers is not restrained by a seatbelt, delaying departure of the AV; and in accordance with a determination that all doors of the AV are closed and all passengers are restrained by a seatbelt, commencing departure of the AV.

Example Process for Operating a Door of an Autonomous Vehicle

Figure 16:
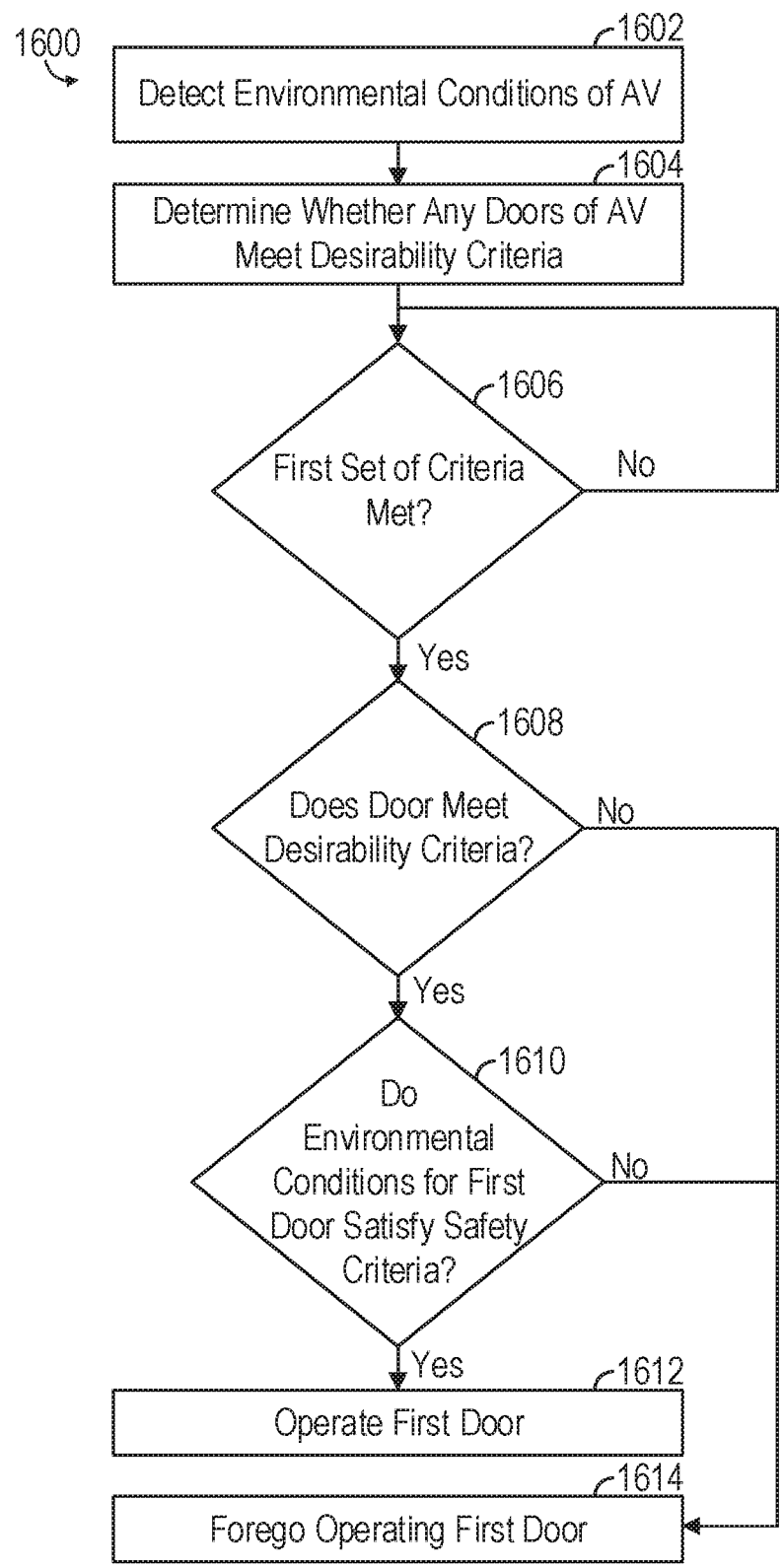
FIG. 16 is a flow chart of an example process for operating a door of an autonomous vehicle.

FIG. 16 is a flow chart of an example process 1600 for operating a door of an AV. For convenience, the process 1600 will be described as being performed by a system of one or more computers located in one or more locations. For example, the computing system represented in ride-hailing network 1300 of FIG. 13, appropriately programmed in accordance with this specification, can perform the process 1600. As such, various operations described herein can be performed across one or more locations including AVs 1302a-1302e, command center 1304, cloud 1306, and user nodes 1308a-1308b. In some embodiments, the process 1600 can be implemented in process 1400, for example, as a sub-process of process 1400. In some embodiments, some operations in process 1600 are, optionally, combined, the orders of some operations are, optionally, changed, and some operations are, optionally, omitted.

At 1602, the system (e.g., ride-hailing network 1300) detects, via one or more sensors (e.g., sensors of an AV (e.g., sensors 121)), environmental conditions surrounding an AV (e.g., AV 1302a). The environmental conditions are associated with a plurality of doors of the AV. In some embodiments, the environmental conditions include the presence of oncoming traffic, the presence of nearby objects such as cars, bikes, or pedestrians, and/or whether objects are clear from an opening/closing path of one or more doors of the AV.

At 1604, the system (e.g., ride-hailing network 1300) determines, based on a set of operational conditions, whether one or more of the plurality of doors of the AV (e.g., AV 1302a) meet desirability criteria (e.g., criteria that, when met, indicate that a respective door is desirable for operation). For example, a door can be determined to be desirable for operation if a passenger is seated adjacent the door. In some embodiments, the set of operation conditions can include, for example, locations of passengers in the AV, presence of items in a cargo region of the AV, proximity of a person relative to a door, and/or whether use of the door has been requested.

At 1606, the system (e.g., ride-hailing network 1300) determines whether a first set of criteria are met. For example, in some embodiments, the first set of criteria are met when the AV (e.g., AV 1302a) has arrived at a predetermined location (e.g., the pick-up location). In some embodiments, the first set of criteria are met when the system detects a request to open or close a door of the AV.

At 1608, in response to determining that the first set of criteria are met, the system (e.g., ride-hailing network 1300) determines whether a first door of the plurality of doors of the AV (e.g., AV 1302a) meets the desirability criteria. In some embodiments, the first door meets the desirability criteria when the set of operational conditions includes an indication that the door is a user-requested door. In some embodiments, the user-requested door is a door located on a side of the AV specified by the user. In some embodiments, the user indicates, via an electronic device associated with the user (e.g., user node 1308a) or via a display associated with the AV, which side of the car the user wishes to access. In such embodiments, one or more doors located on the side of the car the user wishes to access are considered user-requested doors. In some embodiments, the user-requested door is a door of the AV specified by the user. In some embodiments, the user indicates, via an electronic device associated with the user (e.g., the user's smartphone associated with user node 1308a) or via a display associated with the AV, which door of the car the user wishes to access. In such embodiments, the specific door indicated by the user is considered the user-requested door.

In some embodiments, a rear door of the AV meets the desirability criteria when the set of operational conditions includes a first condition that is satisfied when a user of the AV intends to transport luggage. In some embodiments, as a part of determining whether one or more of the plurality of doors of the AV meet desirability criteria, the system (e.g., ride-hailing network 1300) prompts the user to indicate whether the user intends to transport luggage, and indicates whether the first condition is satisfied based on a response indicating whether the user intends to transport luggage.

In some embodiments, the system can implement machine learning to calculate a desirability score and determine whether a particular door meets the desirability criteria based on the calculated desirability score for the respective door. In some embodiments, the desirability score can be calculated based on a number of factors such as, for example, the operational conditions of the AV (e.g., if a door is a user-requested door, where passengers are seated, etc.), environmental conditions of the AV including, for example, the status of the AV and its surroundings (e.g., whether objects are detected near a door, a calculated safe range of motion of a particular door, location of the AV (e.g., which side of the street the AV is parked, whether the AV is parked in a parking lot or street parking, near a busy intersection or on a suburban side street, etc.), speed of nearby vehicles, number of pedestrians nearby, etc.), and other data received by the system. For example, considering a situation in which the AV has four doors (two in the front of the AV and two in the rear) and two passengers are seated in the rear seats of the AV, the system can calculate a greater desirability score for the two rear doors based solely on the proximity of the passengers to the rear doors, whereas the two front door have a low desirability score (e.g., a desirability score that does not meet the desirability criteria). If, however, the system detects that one of the rear doors opens towards oncoming traffic and the other rear door opens to a sidewalk, the system can calculate a greater desirability score for the door opening to the sidewalk. Moreover, the system may determine a low desirability score for the door opening to oncoming traffic such that the desirability score for that door does not meet the desirability criteria. The calculated desirability score can fluctuate as the factors considered for the desirability score change over time. For instance, the system may detect a bicyclist approaching the rear door opening to the sidewalk and, in response, modify the desirability score for the door such that it no longer meets desirability criteria and, optionally, provide an alert to the passengers that the door is no longer desirable for operation. As another example, the system may detect one of the passengers moving to the front passenger-side seat of the AV and, in response, increase the desirability score of the front passenger-side door such that it meets the desirability criteria.

At 1610, in response to determining that the first set of criteria are met, the system (e.g., ride-hailing network 1300) determines whether the environmental conditions for the first door satisfy a set of safety criteria (e.g., no oncoming traffic is detected, no objects are detected near the door, and no objects are obstructing the opening/closing path of the door).

In some embodiments, the system can implement machine learning to calculate a safety score and determine whether the environmental conditions for a particular door satisfy the set of safety criteria based on the calculated safety score for the respective door. In some embodiments, the safety score can be calculated based on the environmental conditions of the AV including, for example, the status of the AV and its surroundings (e.g., whether objects are detected near a door, a calculated safe range of motion of a particular door, location of the AV (e.g., which side of the street the AV is parked, whether the AV is parked in a parking lot or street parking, near a busy intersection or on a suburban side street, etc.), speed of nearby vehicles, number of pedestrians nearby, etc.), and other data received by the system. For example, considering a situation in which the AV has four doors (two in the front of the AV and two in the rear) and is parked on a street, with the driver-side doors opening towards the street and the passenger-side doors opening towards a sidewalk, the system can calculate a greater safety score for the two passenger-side doors based solely on the fact that the doors open towards a sidewalk, whereas the two driver-side doors have a low safety score (e.g., a safety score that does not satisfy the set of safety criteria) based on their opening towards the street. The calculated safety score can fluctuate with detected changes in the environmental conditions of the AV. For instance, the system may detect a bicyclist approaching the passenger-side doors opening to the sidewalk and, in response, modify the safety scores for the passenger-side doors such that they no longer satisfy the set of safety criteria and, optionally, provide an alert to the passengers that the doors are no longer safe for operation. Additionally, the system may also detect that the street to which the driver-side doors open is deserted and, in response, increase the safety scores of the driver-side doors such that they satisfy the set of safety criteria.

At 1612, if the system (e.g., ride-hailing network 1300) determines that the first door meets the desirability criteria and the environmental conditions for the first door satisfy a set of safety criteria, the system operates (e.g., opening and/or closing (e.g., automatically)) the first door of the autonomous vehicle.

In some embodiments, operating the door can include partially opening the door or closing a partially opened door. In some embodiments, the system can control the speed at which the door is operated and can vary the door closing/opening speed based on various factors such as, for example, operational and/or environmental conditions of the AV. For example, if the system detects a pedestrian is approaching the vehicle, the system can inform the user (e.g., via the user's smartphone or a display in the AV) that a pedestrian is approaching the AV and present the user with the option to: a) partially open the door to allow the user to exit the AV as the pedestrian is passing, b) wait for the pedestrian to pass, or c) instruct the AV to move to a new location. If the user elects to partially open the door while the pedestrian is passing, the AV can open the door at a slow speed to avoid startling the approaching pedestrian. In some embodiments, the system communicates (e.g., via displayed messages and/or audio communication) to bystanders, passengers, and/or the user that the doors of the AV are being operated and providing instruction to stay clear of the doors.

At 1614, if the system (e.g., ride-hailing network 1300) determines that the first door of the AV (e.g., AV 1302*a*) does not meet the desirability criteria, or the environmental conditions for the first door fail to satisfy the set of safety criteria (e.g., oncoming traffic is detected, an object is detected near the door, and/or an object is obstructing the opening/closing path of the door), the system forgoes operating the first door of the AV.

In some embodiments, the first set of criteria are met when the system (e.g., ride-hailing network 1300) detects a request to operate the first door of the AV. In some embodiments, further in response to determining that the first set of criteria are met: in accordance with a determination that the environmental conditions for the first door fail to satisfy the set of safety criteria, the system generates a notification that the first door is unsafe for use. In some embodiments, the notification includes an audio component that is communicated over a speaker (e.g., a speaker in the AV and/or a speaker of an electronic device (e.g., smartphone) associated with a user (e.g., user node 1308*a*) of the AV). In some embodiments, the notification includes a visual component (e.g., a text notification) that is displayed on a display device of the AV and/or a display device of an electronic device associated with the user.

In some embodiments, detecting environmental conditions surrounding the AV (e.g., AV 1302*a*) includes detecting a dangerous condition of a first type associated with the first door (e.g., oncoming traffic is detected near the first door). In some embodiments, further in response to determining that the first set of criteria are met: in accordance with a determination that the environmental conditions for the first door fail to satisfy the set of safety criteria, the system (e.g., ride-hailing network 1300) generates a notification that the dangerous condition of the first type is associated with the first door. In some embodiments, the notification includes an audio component that is communicated over a speaker (e.g., a speaker in the AV and/or a speaker of an electronic device (e.g., smartphone) associated with a user of the AV) and identifying the dangerous condition associated with the door. In some embodiments, the notification includes a visual component (e.g., a text notification) that is displayed on a display device of the AV and/or a display device of an electronic device associated with the user. For example, if the dangerous condition is oncoming traffic near the rear driver-side door, the notification can include an audio recording that says "Please be aware of oncoming traffic approaching the rear driver-side door," and a similar notification that is displayed via text on the user's electronic device and/or a display in the AV.

In some embodiments, the system (e.g., ride-hailing network 1300) displays, via a display device (e.g., a display device of the AV and/or a display device of an electronic device associated with a user (e.g., occupant/passenger) of the AV), a representation of the AV, including a representation of the plurality of doors of the AV. In some embodiments, further in response to determining that the first set of criteria are met: in accordance with a determination that the environmental conditions for a first set of the plurality of doors (e.g., one or more of the plurality of doors (e.g., the first door)) satisfy the set of safety criteria, the system updates the representation of the AV to include an indication that the first set of the plurality of doors are safe for use. In some embodiments, further in response to determining that the first set of criteria are met: in accordance with a determination that the environmental conditions for a second set of the plurality of doors fail to satisfy the set of safety criteria, the system updates the representation of the AV to include an indication that the second set of the plurality of doors are unsafe for use.

In some embodiments, the system (e.g., ride-hailing network 1300) receives an indication from a user of the AV (e.g., AV 1302*a*) that the environmental conditions associated with the plurality of doors of the AV include a safety concern (e.g., an unwanted person is nearby; presence of oncoming traffic; presence of nearby objects such as cars, bikes, pedestrians, etc.). In response to receiving the indication from the user, the system determines that the environmental conditions associated with the plurality of doors of the AV fail to satisfy the set of safety criteria. In some embodiments, the indication from the user is activation of a distress call (e.g., an emergency signal that is activated by selecting an affordance (e.g., a panic button) displayed on the user's smartphone or an in-vehicle display). In some embodiments, in response to receiving the indication from the user that the environmental conditions associated with the plurality of doors of the AV include a safety concern, the system activates one or more door locks of the AV and initiates contact (e.g., a phone call, a video call, or a chat session initiated via an electronic device associated with the user or an electronic device associated with the AV) with an entity associated with the autonomous vehicle (e.g., a dispatch service, a customer-support center (e.g., command center 1304)).

In the foregoing description, embodiments have been described with reference to numerous specific details that may vary from implementation to implementation. The description and drawings are, accordingly, to be regarded in an illustrative rather than a restrictive sense. The sole and exclusive indicator of the scope of the claims, and what is intended by the applicants to be the scope of the claims, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A system comprising:
one or more computer processors; and
one or more non-transitory storage media storing instructions which, when executed by the one or more computer processors, cause performance of operations comprising:
receiving, at a first electronic device, a request to dispatch an autonomous vehicle;
in response to receiving the request to dispatch an autonomous vehicle:
generating a passcode,
transmitting the passcode to a second electronic device associated with a user account, and
transmitting the passcode to a third electronic device associated with an autonomous vehicle;
based on a determination that the autonomous vehicle has arrived at a first location, determining whether at least one door of the autonomous vehicle is obstructed;
based on a determination that the at least one door is not obstructed, causing the at least one door to open;
in accordance with a determination that authorization criteria for the user account is satisfied, wherein the authorization criteria for the user account includes a first criterion that is satisfied when a user provides the passcode after the user has entered the vehicle, enabling a process for requesting departure of the autonomous vehicle, wherein the process for requesting departure of the autonomous vehicle includes:
displaying, via a display device, an affordance corresponding to a request to initiate departure of the autonomous vehicle from the first location, and
in response to a determination that the affordance has been selected, initiating departure of the autonomous vehicle from the first location.

2. The system of claim 1, the operations further comprising:
after receiving the request to dispatch the autonomous vehicle, enabling one or more actions to be performed at the autonomous vehicle, including:
receiving a request to perform a first action; and
in accordance with a determination that the request satisfies a first set of criteria, wherein the first set of criteria includes a criterion that is satisfied when the request is initiated by the user account, performing, at the autonomous vehicle, the first action.

3. The system of claim 1, the operations further comprising:
after receiving the request to dispatch the autonomous vehicle:
enabling display of a text-identifier at a display device associated with the third electronic device; and
transmitting a copy of the text-identifier to the second electronic device associated with the user account.

4. The system of claim 1, wherein the request to dispatch the autonomous vehicle includes an indication of a number of expected passengers for riding in the autonomous vehicle.

5. The system of claim 4, wherein the authorization criteria for the user account includes a second criterion that is satisfied when a number of passengers detected in the autonomous vehicle matches the number of expected passengers, the operations further comprising:
in accordance with a determination that the authorization criteria for the user account is not satisfied based on a determination that the number of passengers detected in the autonomous vehicle does not match the number of expected passengers, initiating a process for rectifying passenger count.

6. The system of claim 1, wherein the authorization criteria for the user account includes a third criterion that is satisfied when a face is authorized using a facial recognition process.

7. The system of claim 6, wherein the facial recognition process includes:
detecting facial characteristics of the face;
comparing the facial characteristics of the face to a facial profile associated with the user account; and
in accordance with a determination that a threshold amount of the facial characteristics of the face match the facial profile associated with the user account, authorizing the face.

8. The system of claim 1, wherein forgoing enabling the process for requesting departure of the autonomous vehicle includes initiating contact with an entity associated with the first electronic device.

9. The system of claim 1, the operations further comprising:
prior to determining whether the authorization criteria for the user account is satisfied:
in accordance with a determination that a first set of location-based criteria are met, permitting access to an interior region of the autonomous vehicle; and
in accordance with a determination that the first set of location-based criteria are not met, restricting access to the interior region of the autonomous vehicle.

10. The system of claim 1, wherein initiating departure of the autonomous vehicle includes:
- determining whether an object is obstructing at least one open door of the autonomous vehicle;
- based on a determination that an object is no obstructing the at least one open door, automatically closing the at least one open door; and
- determining whether at least one passenger is restrained by a seatbelt.

11. The system of claim 10, the operations further comprising:
- in accordance with a determination that one or more doors of the autonomous vehicle are not closed the at least one passenger is not restrained by a seatbelt, delaying departure of the autonomous vehicle; and
- in accordance with a determination that all doors of the autonomous vehicle are closed and all passengers are restrained by a seatbelt, commencing departure of the autonomous vehicle.

12. A method comprising:
- receiving, at a first electronic device, a request to dispatch an autonomous vehicle;
- in response to receiving the request to dispatch an autonomous vehicle:
  - generating a passcode,
  - transmitting the passcode to a second electronic device associated with a user account, and
  - transmitting the passcode to a third electronic device associated with an autonomous vehicle;
- based on a determination that the autonomous vehicle has arrived at a first location, determining whether at least one door of the autonomous vehicle is obstructed;
- based on a determination that the at least one door is not obstructed, causing the at least one door to open;
- in accordance with a determination that authorization criteria for the user account is satisfied, wherein the authorization criteria for the user account includes a first criterion that is satisfied when a user provides the passcode after the user has entered the vehicle, enabling a process for requesting departure of the autonomous vehicle, wherein the process for requesting departure of the autonomous vehicle includes:
  - displaying, via a display device, an affordance corresponding to a request to initiate departure of the autonomous vehicle from the first location, and
  - in response to a determination that the affordance has been selected, initiating departure of the autonomous vehicle from the first location.

13. The method of claim 12, further comprising:
- after receiving the request to dispatch the autonomous vehicle, enabling one or more actions to be performed at the autonomous vehicle, including:
  - receiving a request to perform a first action;
  - in accordance with a determination that the request satisfies a first set of criteria, wherein the first set of criteria includes a criterion that is satisfied when the request is initiated by the user account, performing, at the autonomous vehicle, the first action.

14. The method of claim 12, further comprising:
- after receiving the request to dispatch the autonomous vehicle:
  - enabling display of a text-identifier at a display device associated with the third electronic device; and
  - transmitting a copy of the text-identifier to the second electronic device associated with the user account.

15. The method of claim 12, wherein the request to dispatch the autonomous vehicle includes an indication of a number of expected passengers for riding in the autonomous vehicle, and wherein the authorization criteria for the user account includes a second criterion that is satisfied when a number of passengers detected in the autonomous vehicle matches the number of expected passengers, the method further comprising:
- in accordance with a determination that the authorization criteria for the user account is not satisfied based on a determination that the number of passengers detected in the autonomous vehicle does not match the number of expected passengers, initiating a process for rectifying passenger count.

16. The method of claim 12, wherein the authorization criteria for the user account includes a third criterion that is satisfied when a face is authorized using a facial recognition process, and wherein the facial recognition process includes:
- detecting facial characteristics of the face;
- comparing the facial characteristics of the face to a facial profile associated with the user account; and
- in accordance with a determination that a threshold amount of the facial characteristics of the face match the facial profile associated with the user account, authorizing the face.

17. The method of claim 12, further comprising:
- prior to determining whether the authorization criteria for the user account is satisfied:
  - in accordance with a determination that a first set of location-based criteria are met, permitting access to an interior region of the autonomous vehicle; and
  - in accordance with a determination that the first set of location-based criteria are not met, restricting access to the interior region of the autonomous vehicle.

18. The method of claim 12, wherein initiating departure of the autonomous vehicle includes:
- determining whether an object is obstructing at least one open door of the autonomous vehicle;
- based on a determination that an object is no obstructing the at least one open door, automatically closing the at least one open door; and
- determining whether at least one passenger is restrained by a seatbelt.

19. The method of claim 18, further comprising:
- in accordance with a determination that one or more doors of the autonomous vehicle are not closed the at least one passenger is not restrained by a seatbelt, delaying departure of the autonomous vehicle; and
- in accordance with a determination that all doors of the autonomous vehicle are closed and all passengers are restrained by a seatbelt, commencing departure of the autonomous vehicle.

20. A non-transitory computer-readable storage medium storing one or more programs configured to be executed by one or more computing devices, the one or more programs including instructions for:
- receiving, at a first electronic device, a request to dispatch an autonomous vehicle;
- in response to receiving the request to dispatch an autonomous vehicle:
  - generating a passcode,
  - transmitting the passcode to a second electronic device associated with a user account, and
  - transmitting the passcode to a third electronic device associated with an autonomous vehicle;
- based on a determination that the autonomous vehicle has arrived at a first location, determining whether at least one door of the autonomous vehicle is obstructed;

based on a determination that the at least one door is not obstructed, causing the at least one door to open;

in accordance with a determination that authorization criteria for the user account is satisfied, wherein the authorization criteria for the user account includes a first criterion that is satisfied when a user provides the passcode after the user has entered the vehicle, enabling a process for requesting departure of the autonomous vehicle, wherein the process for requesting departure of the autonomous vehicle includes:

displaying, via a display device, an affordance corresponding to a request to initiate departure of the autonomous vehicle from the first location, and in response to a determination that the affordance has been selected, initiating departure of the autonomous vehicle from the first location.

* * * * *